US012647635B2

(12) United States Patent
McBeth et al.

(10) Patent No.: US 12,647,635 B2
(45) Date of Patent: *Jun. 2, 2026

(54) SYSTEM AND METHOD FOR BUILDING INTERACTIVE WEB3 STREAMING NETWORKS AS A SERVICE

(71) Applicant: Digital Independents LLC, Sheridan, WY (US)

(72) Inventors: Falon McBeth, Milpitas, CA (US); Mark Cuban, Milpitas, CA (US)

(73) Assignee: Digital Independents LLC, Sheridan, WY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/761,309

(22) Filed: Jul. 2, 2024

(65) Prior Publication Data

US 2024/0357193 A1     Oct. 24, 2024

Related U.S. Application Data

(63) Continuation of application No. 18/083,235, filed on Dec. 16, 2022, now Pat. No. 12,069,327.

(51) Int. Cl.
| | |
|---|---|
| *H04N 21/266* | (2011.01) |
| *G06Q 20/36* | (2012.01) |
| *H04L 65/1069* | (2022.01) |
| *H04L 65/1093* | (2022.01) |
| *H04L 65/403* | (2022.01) |
| *H04N 21/2187* | (2011.01) |

(Continued)

(52) U.S. Cl.
CPC ....... *H04N 21/266* (2013.01); *G06Q 20/3672* (2013.01); *H04L 65/1069* (2013.01); *H04L 65/1093* (2013.01); *H04L 65/403* (2013.01);

*H04N 21/2187* (2013.01); *H04N 21/231* (2013.01); *H04N 21/2543* (2013.01); *G06Q 2220/00* (2013.01)

(58) Field of Classification Search
CPC ............ H04N 21/266; H04N 21/2187; H04N 21/231; H04N 21/2543
See application file for complete search history.

(56) References Cited

U.S. PATENT DOCUMENTS

| | | |
|---|---|---|
| 10,726,489 B1 | 7/2020 | Hamilton |
| 10,897,647 B1 | 1/2021 | Hunter Crawley |
| 11,115,228 B2 | 9/2021 | Delanghe |

(Continued)

*Primary Examiner* — Anthony Bantamoi
(74) *Attorney, Agent, or Firm* — Vela Wood Staley Young P.C.; Steven Wood

(57) ABSTRACT

A method and system for generating and distributing collaborative content of communication sessions are disclosed. In some embodiments, the method includes initiating a communication session in response to a request from a first user, the communication session associated with a set of audience including a second user. The method includes positioning the second user on a virtual stage of the communication session. The method includes enabling the first user and the second user to co-host the communication session based on detecting and recording both the first user's activities and the second user's activities while the communication session is progressing. The method then includes receiving user interactions between the first user, the second user, and other audience in the set. The method further includes generating content of the communication session to include the recorded activities and received user interactions.

48 Claims, 21 Drawing Sheets

(51) Int. Cl.
  *H04N 21/231*    (2011.01)
  *H04N 21/2543*   (2011.01)

(56)        References Cited

U.S. PATENT DOCUMENTS

| | | | |
|---|---|---|---|
| 11,418,461 | B1 | 8/2022 | Elfardy |
| 2004/0194150 | A1 | 9/2004 | Banker |
| 2012/0269360 | A1 | 10/2012 | Burke |
| 2017/0206793 | A1 | 7/2017 | Flaherty |
| 2020/0184156 | A1 | 6/2020 | Badr |
| 2021/0297779 | A1 | 9/2021 | Hawke |
| 2021/0306173 | A1 | 9/2021 | Krikunov |
| 2022/0210514 | A1 | 6/2022 | McBeth et al. |

282

510

512

514

500

502

First platform with full analytics, editing, and ad embedding

Hit Prediction Insights: How audience is reacting as they consume content live

- Understand audience and content that is resonating most with them
- Edit Transcript Text
- Cut Audio and Video w/one tap
- Remove sound effects
- Embed up to 10 ad slots for distribution
- Add trailers and bumpers

1204

1202

1206

1208

1210

1214    1212

1218

1220

1216

1222

1222

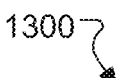

1300

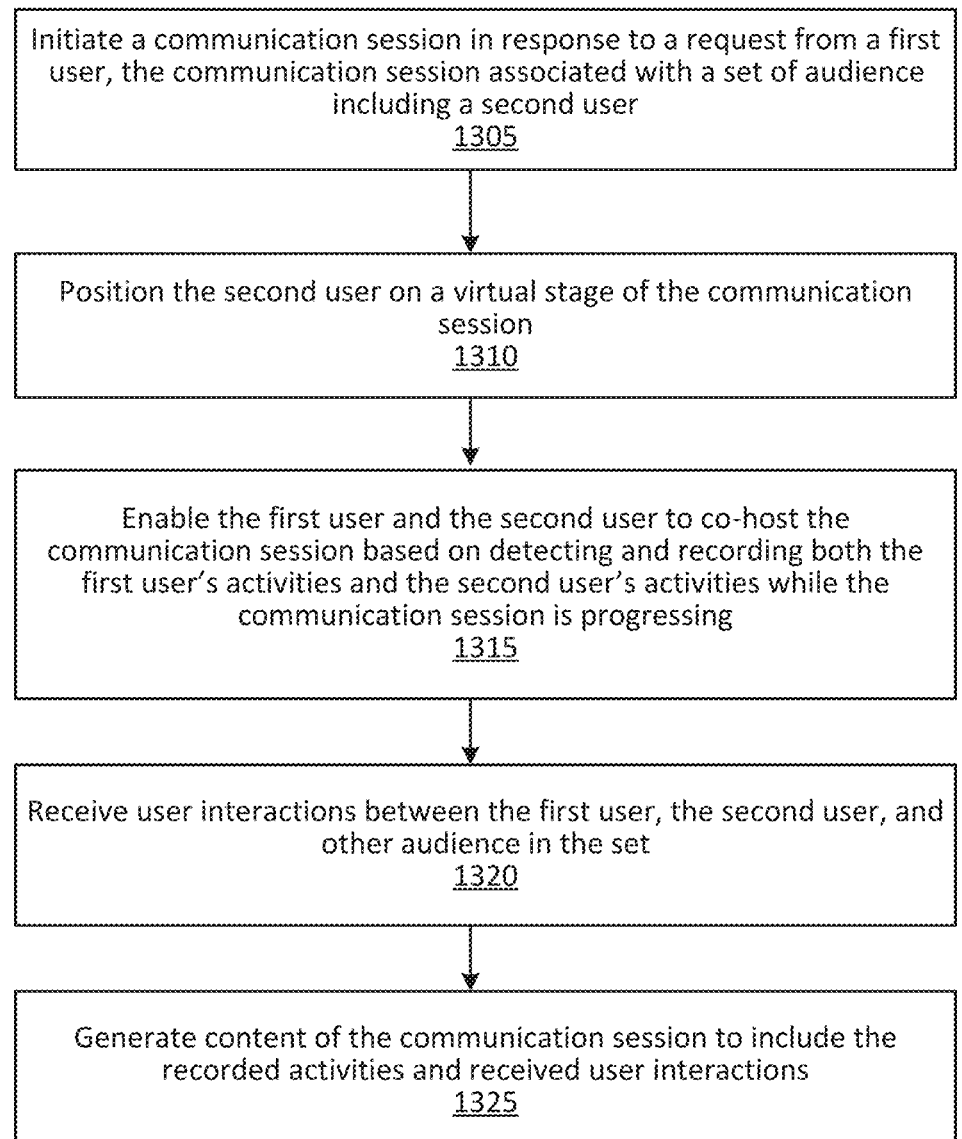

Initiate a communication session in response to a request from a first user, the communication session associated with a set of audience including a second user
1305

Position the second user on a virtual stage of the communication session
1310

Enable the first user and the second user to co-host the communication session based on detecting and recording both the first user's activities and the second user's activities while the communication session is progressing
1315

Receive user interactions between the first user, the second user, and other audience in the set
1320

Generate content of the communication session to include the recorded activities and received user interactions
1325

Figure 13

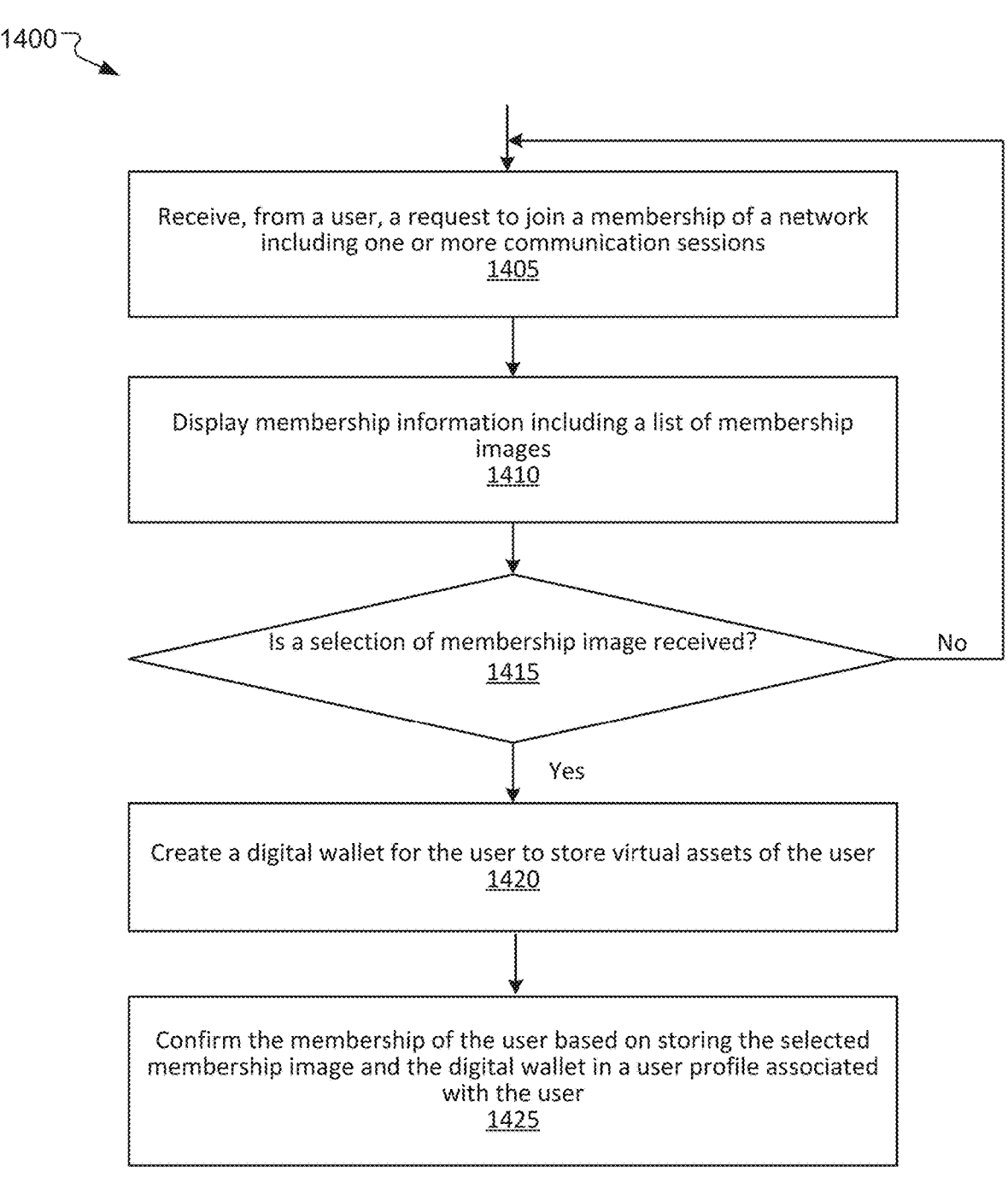

1400

Receive, from a user, a request to join a membership of a network including one or more communication sessions
1405

Display membership information including a list of membership images
1410

Is a selection of membership image received?
1415

No

Yes

Create a digital wallet for the user to store virtual assets of the user
1420

Confirm the membership of the user based on storing the selected membership image and the digital wallet in a user profile associated with the user
1425

Figure 14

SYSTEM AND METHOD FOR BUILDING INTERACTIVE WEB3 STREAMING NETWORKS AS A SERVICE

This application is a continuation of and claims the benefit under 35 U.S.C. § 120 of the earlier filing date of U.S. Nonprovisional application Ser. No. 18/083,235, filed on Dec. 16, 20221, which is hereby incorporated in entirety by reference

TECHNICAL FIELD

This disclosure relates to a method and system for generating and distributing collaborative/participatory content of communication sessions based on non-fungible tokens (NFT) powered memberships and blockchain solutions.

BACKGROUND

Content management systems (e.g., streaming applications, podcasting services) allow content providers or creators to design and provide content for delivery to users or audiences using computer networks. These systems, however, face many challenges. Content creators using existing content management systems may not efficiently create content attractive to audiences. For example, the existing systems lack analytics, tools, or other mechanisms to help creators to assess and improve content quality before the content is distributed to audiences. The content providing process is a one-way communication process, where audiences cannot participate in content creation and further act as content owners or co-creators to make contribution to obtain collaboratively-created content. Additionally, content creators do not own their audiences. Rather, social networks or other platforms monopolized by large technology companies own the audiences because content creators and audiences communicate with each other through these middlemen. When the companies change their policies, creators may lose their audiences without any control, and audiences may lose their virtual assets, if any, received related to content generation and distribution.

SUMMARY

To address the aforementioned shortcomings, a method and a system for generating and distributing collaborative/participatory content of communication sessions based on NFT-powered memberships and blockchain solutions are provided. The method initiates a communication session in response to a request from a first user, the communication session associated with a set of audience including a second user. The method positions the second user on a virtual stage of the communication session. The method enables the first user and the second user to co-host the communication session based on detecting and recording both the first user's activities and the second user's activities while the communication session is progressing. The method receives user interactions between the first user, the second user, and other users in the set. The method then generates content of the communication session to include the recorded activities and received user interactions.

The above and other preferred features, including various novel details of implementation and combination of elements, will now be more particularly described with reference to the accompanying drawings and pointed out in the claims. It will be understood that the particular methods and apparatuses are shown by way of illustration only and not as limitations. As will be understood by those skilled in the art, the principles and features explained herein may be employed in various and numerous embodiments.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

FIG. 13 illustrates a flowchart of generating and distributing collaborative content of communication sessions, according to some embodiments.

FIG. 14 illustrates a flowchart of a process for a user to join a membership, according to some embodiments.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

The present disclosure provides an audio and visual social communication platform that empowers creators to create, broadcast, record, distribute, and monetize online communications to promote effective and interesting discourse. In particular, the present platform described herein is a first participatory content-management platform used by creators and brands to accelerate building their own studio, network, and streaming platforms of the future. The present platform allows a creator together with audiences to create productive and real-time conversations and generate interactive and collaborative content. The online communication session or the conversation may be a virtual meeting, an online chat, a live show, etc. The content may be text, audio, and/or video.

Using the present participatory content-management platform, creators may produce and distribute live video and audio programs that enable the creators to connect in real-time with their audience and feel the "heat." The technical model adopted by the present platform allows creators to own their audience, control their content, and get access to viewer analytics that help the creators predict successful communication sessions or shows. Audience growth and network effects are built in the new content formats that include the highly interactive content created from the direct communication between creators and audiences. In addition, through a single tap, creators may share live and pre-recorded content to various social platforms, and even distribute the on-demand content to millions of households on linear TV. Moreover, the present platform is Web2, Web3, and metaverse compatible, which offers multiple monetization opportunities including NFT-powered network memberships.

Figure 1:
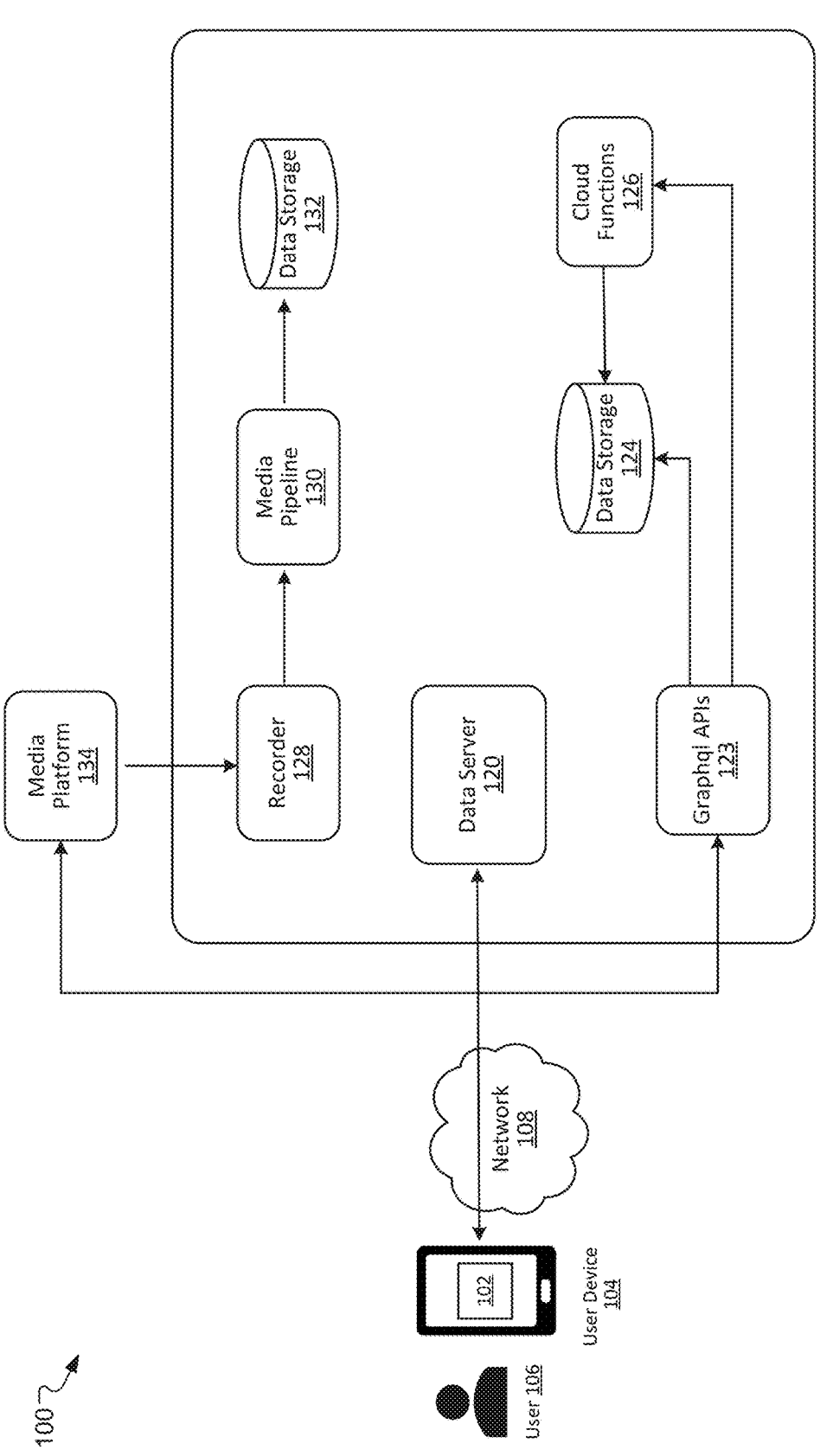
FIG. 1 illustrates a block diagram of system architecture for managing collaborative and participatory content, according to some embodiments.

FIG. 1 illustrates a block diagram of system/platform architecture 100 for managing collaborative and participatory content, according to some embodiments. Managing the collaborative content may include one or more of generating, publishing, distributing, discovering, or monetizing the content. A user device 104 may be accessed by user 106 to perform content management-related tasks via the software application 102. By way of example and not limitation, user device 104 can be a smartphone device, a tablet, a tablet personal computer (PC), or a laptop PC. In some embodiments, user device 104 can be any suitable electronic device connected to a network 108 via a wired or wireless connection and capable of running software applications like software application 102. In some embodiments, user device 104 can be a desktop PC running software application 102. In some embodiments, software application 102 can be installed on user device 104 or be a web-based application running on user device 104. By way of example and not limitation, user 106 can be a creator who generates, publishes, and distributes the content, an audience who collaborates with the creator to generate the content or a user/audience who searches for the content. The user can communicate with data server 120 and other entities in platform 100 via software application 102 residing on user device 104.

Network 108 can be an intranet network, an extranet network, a public network, or combinations thereof used by software application 102 to exchange information with one or more remote or local servers such as data server 120. According to some embodiments, software application 102 can be configured to exchange information, via network 108, with additional servers/entities that belong to system 100 or other systems similar to system 100 not shown in FIG. 1.

In some embodiments, platform 100 provides a set of services oriented at flexible data access and fast iteration. This includes a set of graphql application program interfaces (APIs) 122 that accesses data storage 124 directly or via cloud functions 126. In some embodiments, graphql APIs 123 may be powered by Hasura® and backed by a Postgres® database 124 with lambda functions 126 for handling business logic. Platform 100 also provides a robust and extensible media processing pipeline 130 that processes the recording and transcoding of a communication session/conversation received from recorder 128 and stores the processed data in data storage 132. A media platform 134 distributes media data (e.g., audio) to recorder 128 for recording the content. In some embodiments, media processing pipeline 130 may be a GStreamer® framework, recorder 128 and data storage 132 may be Google® infrastructure, and media platform 134 may be Agora© platform.

In some embodiments, one or more third-party servers perform the corresponding functionalities of components 122-134. Data server 120 communicates with user device 104 via software application 102 and cooperates with the third-party servers using APIs over a network (e.g., network 108) to implement the functionalities described herein.

Overall Content Management Process

The present disclosure allows for collaborative content creation between audience(s) and creator(s), that is, generating quality content and providing the content via various social platforms based on analyzing and understanding audience reactions to the content. In particular, the present platform/system described herein allows content creators to own and control their own content, directly connect with their fans and followers, maximize the reach to audiences, and obtain most values from the audience reach, audience participation, and NFT memberships.

Figure 2A:
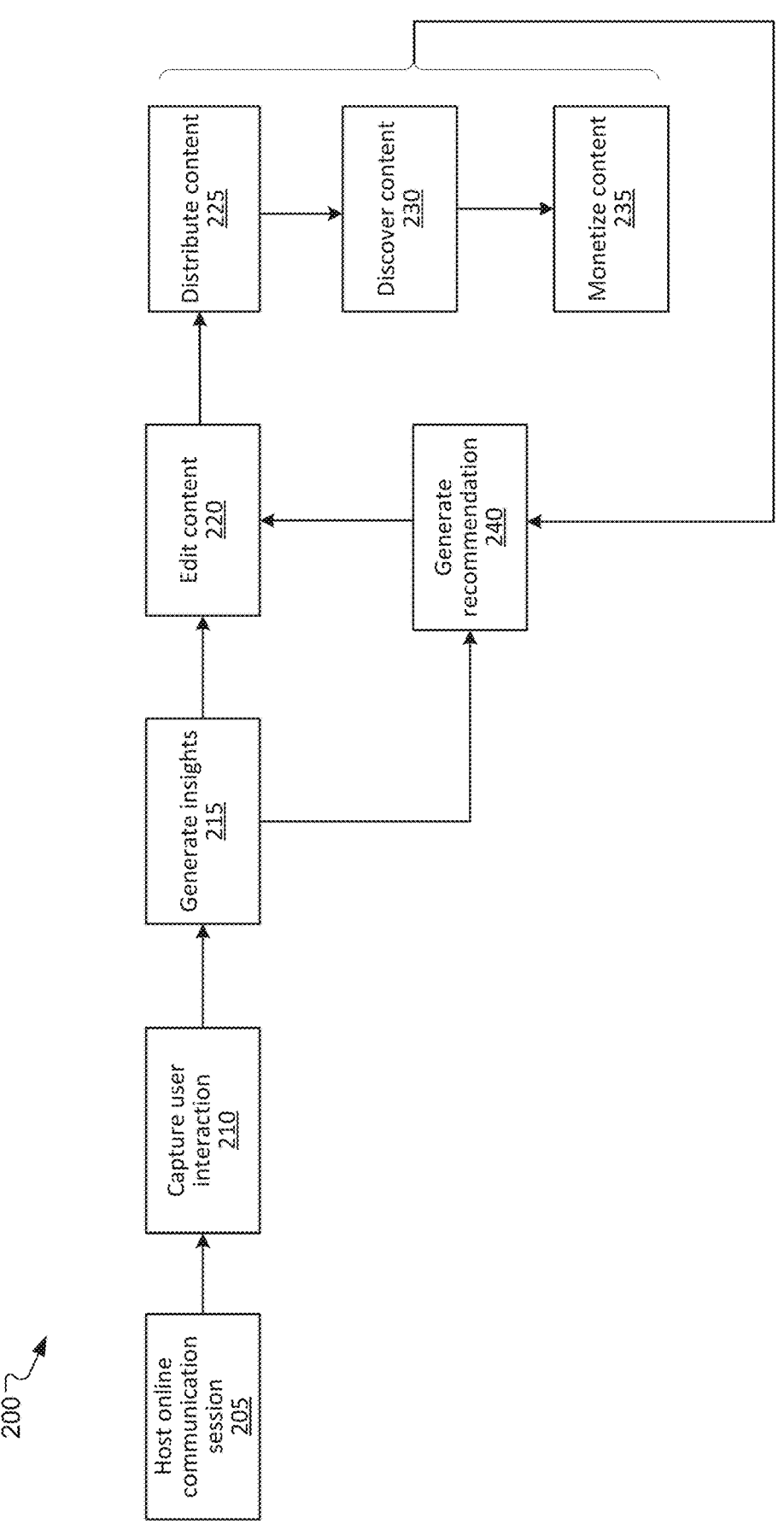
FIG. 2A illustrates an exemplary high-level process for managing collaborative and participatory content, according to some embodiments.

FIG. 2A illustrates an exemplary high-level process 200 for managing (e.g., generating, distributing) collaborative and participatory content. In some embodiments, process 200 may be implemented by data server 120 in communication with user device 104 and other entities (e.g., components 122-134) in system 100 of FIG. 1. It should be noted process 200 as shown in FIG. 2A merely includes exemplary operations that can be added, removed, or modified.

In the illustrated embodiment, process 200 starts with operation 205 to host an online communication session. The communication session or conversation may be a live show, a webinar, an industry forum, an online chat through social networking service, a training session, or any other type of virtual meetings. In some embodiments, hosting an online communication session includes allowing a creator to create the communication session and a user to join the communication session. A creator may create a communication session about a topic via a software application (e.g., a mobile application, web application) of a user device (e.g., a mobile device). A user may join the communication session (e.g., based on viewing a preview of the communication session). The user participating in the communication session is an audience. The creator may invite one or more audience or other creators to participate in the communication session.

At operation 210, user interactions in the communication session are captured. The other creator(s) invited by the creator may co-host the communication session with the creator, play as a panelist in the communication session, or participate in a 1:1 interview during the communication session. An audience may ask questions to speakers and react with emojis and/or messages in the communication session. In some embodiments, the audience may be added to a virtual stage of the communication session (e.g., a show) to participate in or co-host the show with the host/creator as if they were in the same place. For example, a crime show host can bring a viewer to the scene of a crime, and a home designer can walk through her audience to the house in innovation. More than reacting with sound effects and/or emojis, the selected audience shows up on the virtual scene/stage to solve the crime or work out the details of house innovation together with the hosts. In other words, the present disclosure allows a communication session to be recorded in real time, where the real-time participation of the audience and other creators in the session is also recorded. The participation itself is part of the content of the communication session.

In some embodiments, the present system allows audiences to join the membership of a creator's network such that they can discuss with community members and contribute ideas to the production of the creator's communication sessions, obtain early and/or exclusive access to new communication sessions, transact virtual assets with community members, etc. The creator's network or channel relates to a variety of operations and users (e.g., communities) through which the creator's featured communication sessions are produced, distributed, and consumed. The virtual assets may be rewards achieved from participation in the communication sessions or NFTs associated with the communication sessions. In this way, audience participation may be further enhanced.

The present disclosure also allows the audience, speakers, creators, and panelists to broadcast the communication session to a third-party platform. For example, a show may be recorded live as well as being available on-demand and streamed to others later. In some embodiments, the present disclosure supports an artifact-sharing system that facilitates the creator, speakers, and/or audience to leverage rich media or widgets within a communication session (e.g., a virtual auditorium) to record, edit, and share the content of the communication session. For example, the artifact sharing system may provide a picture-in-audio/video for displaying on a user device associated with an audience. The artifact sharing system may also allow the audience or other users to screen share and stream the content of the communication session on the Internet within a user interface or share a static link without leaving the present platform.

At operation 215, various types of insights related to the communication session are generated. For example, the creators and speakers may receive content insights. The content insights may include user feedback on which portion(s) of the recorded communication session people were most engaged, least engaged, had the highest positive sentiment, etc. There are many other types of insights (e.g., replay insights), which will be described below with reference to FIGS. 8A-8B. These insights provide creators and speakers feedback on how to improve the content generation, e.g., avoiding topics, segments, and the audience that are not engaging and creating quality content on the fly or in the next communication session. These insights also help a creator generate a preview clip of the communication session that easily attracts the audience.

At operation 220, the present disclosure allows the creator to edit the content (e.g., text, video, and audio) of the communication session using one or more filters and editing tools. The present disclosure allows the creator to generate a collaborative piece of content with his/her audience on the present platform based on, for example, determining any audio and video content format the creator wants to use, determining the way the creator wants the audience to be involved in the creation of the content, etc. In some embodiments, the content may be automatically transcribed. Creators may edit the content, for example, cut video/audio, edit the transcript, remove sound effects, etc., with a single tap.

After the content of the communication session is edited, at operation 225, it may be distributed. Alternatively or additionally, the content may be distributed without any editing. In some embodiments, the content may be distributed across multiple platforms including the present platform described herein and other third-party platforms, for example, through a public profile of the creator and/or participant(s) associated with the present platform. For example, the content may be broadcast live on the present platform as well as on other third-party platforms such as YouTube® live at the same time. In some embodiments, the present disclosure allows the content to be distributed to households on linear TV.

Upon the distribution of the content, at operation 230, the content may be searched and discovered by users. In some embodiments, the present disclosure facilitates the discovery of recorded content to all users via a featured section in a main communication session feed. According to the present disclosure, with a single tap, content feeds can be used as a discovery mechanism to tap the content into live communication sessions and into commerce. For example, the present system allows creators to import their existing podcasts from any existing podcast platform or custom a really simple syndication (RSS) feed with just 1-click or 1-tap, without losing subscribers. The creators therefore are able to keep their original subscribers as well as adding new subscribers in a new platform with a single-tap content feed, which brings more audiences and more commerce. In addition to importing from any valid podcast RSS feed, the present system also includes custom importers for various platforms such as Anchor®, AudioBoom®, Blubrry®, etc. This further simplifies the content generation and distribution and increases monetization opportunities.

In addition, the present disclosure allows monetization of the content at operation 235, for example, via virtual goods, subscriptions, event tickets, brand sponsorships, tips, etc.

In some embodiments, user feedback regarding content distribution, discovery, or monetization is collected and fed into one or more machine learning (ML) models to generate one or more recommendations at operation 240. The one or more machine learning models may also use the insights generated at operation 215 as input to train the one or more ML models to generate the recommendations. In some embodiments, as depicted, a recommendation may be provided for a creator to edit the content prior to the content being distributed. In other embodiments, a recommendation may be provided for improving the subsequent content generation, e.g., recommending domain experts, instructing creators to create communication sessions on certain hot topics, etc.

The present disclosure may record and analyze every interaction/conversation for every user (e.g., speakers, audience). In some embodiments, the user interactions are analyzed to identify users' domain expertise across a particular set of topic areas. For example, the present disclosure may analyze discussions around a topic, audience reactions, sentiments, user feedback, community standings on one or more platforms, shared artifacts and metadata associated with the artifacts, inferences from social connections, etc. Therefore, when a user creates content around a particular topic area, the present disclosure may recommend verified domain experts to bring it into that discussion. The present disclosure may further store and analyze user content creation and interactions to generate predictions or recommendations at scale.

To generate the recommendations, the present disclosure may combine one or more of a social graph, interest graph, and expertise graph to perform clustering on different dimensions. For example, the present disclosure may create a representation of proximity (e.g., the strength of a relationship) between topics, users (e.g., creators), and content formats, and thus power the recommendation generation in a personalized manner to individual users. With the combination of editorial and machine learning approaches, not only the high-quality content can be surfaced to a user, but also the content can continue to be trained/learned and improved over time.

Generally, the present disclosure supports both synchronous (e.g., drop-in, live streaming) and asynchronous (e.g., podcasting) content generation and publication, allowing creators to store and distribute their recordings via audio, video, and text (e.g., transcription). The present disclosure provides the creators with the controls necessary to generate desired content, enables the creators to distribute and monetize the generated content effectively, and obtains valuable feedback and insights to continue to create better content that drives retention, engagement, and revenue growth.

Figure 2B:
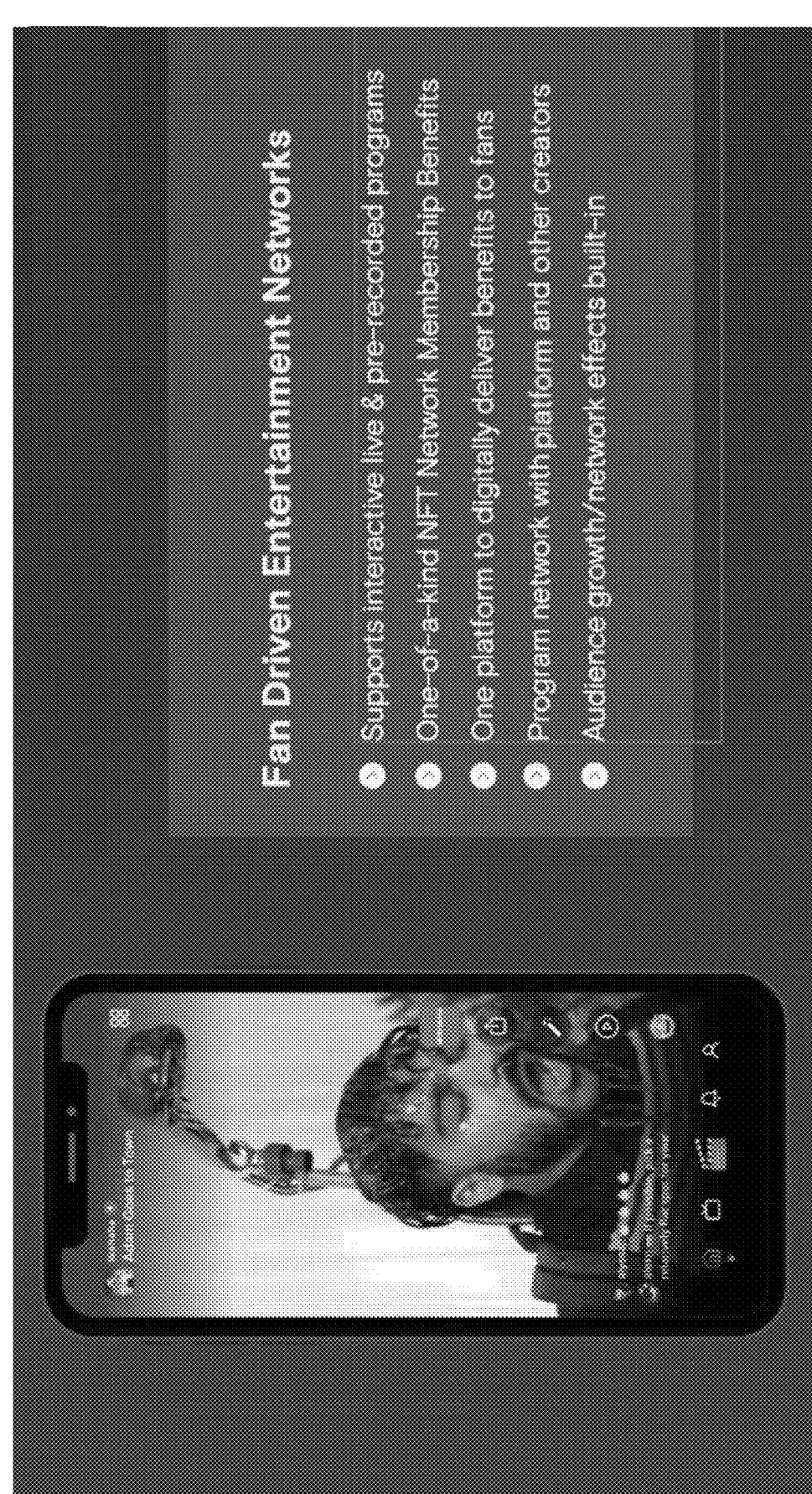
FIGS. 2B-2D illustrate some unique features of the present interactive Web3 streaming network system, according to some embodiments.
Figure 2C:
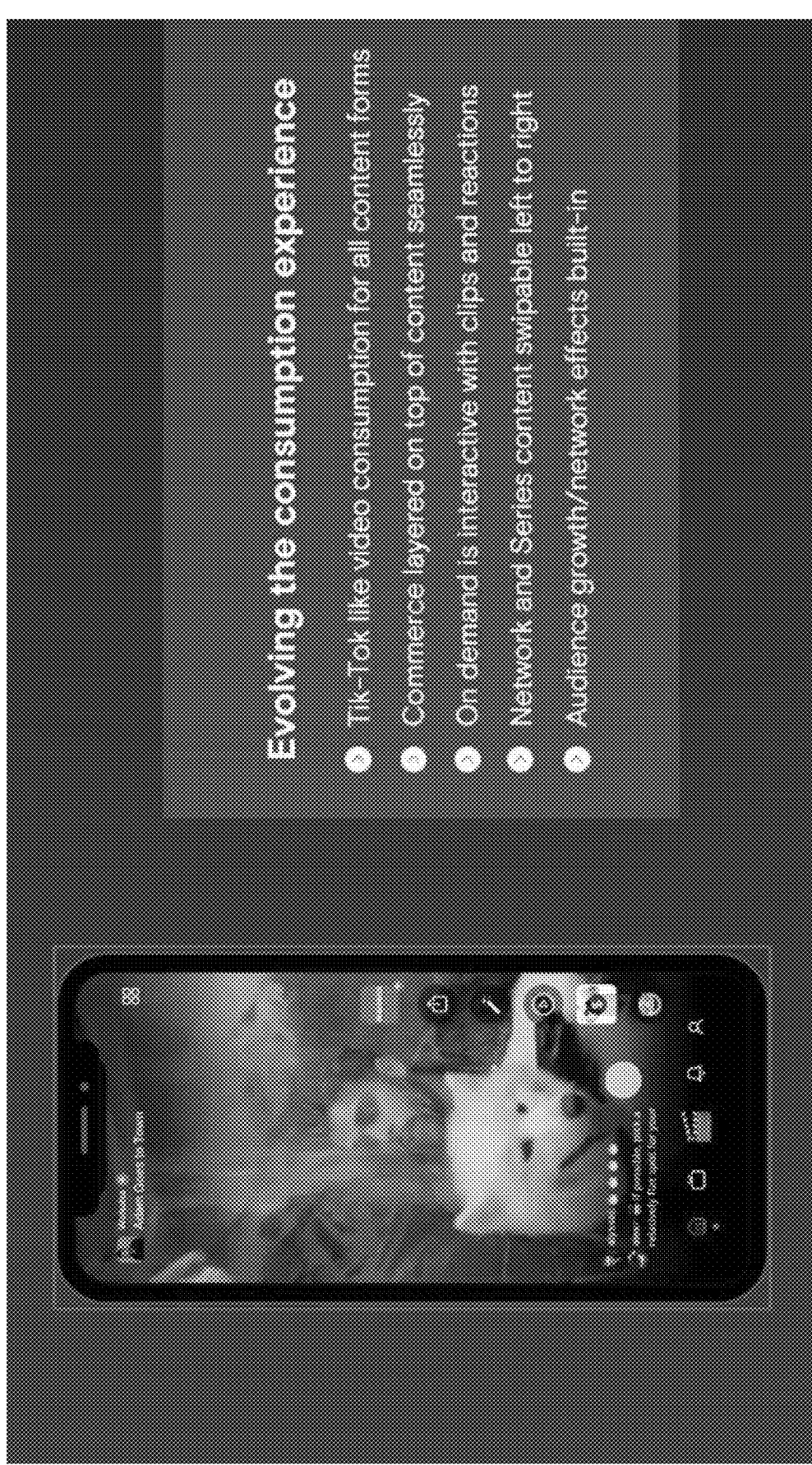
Figure 2D:
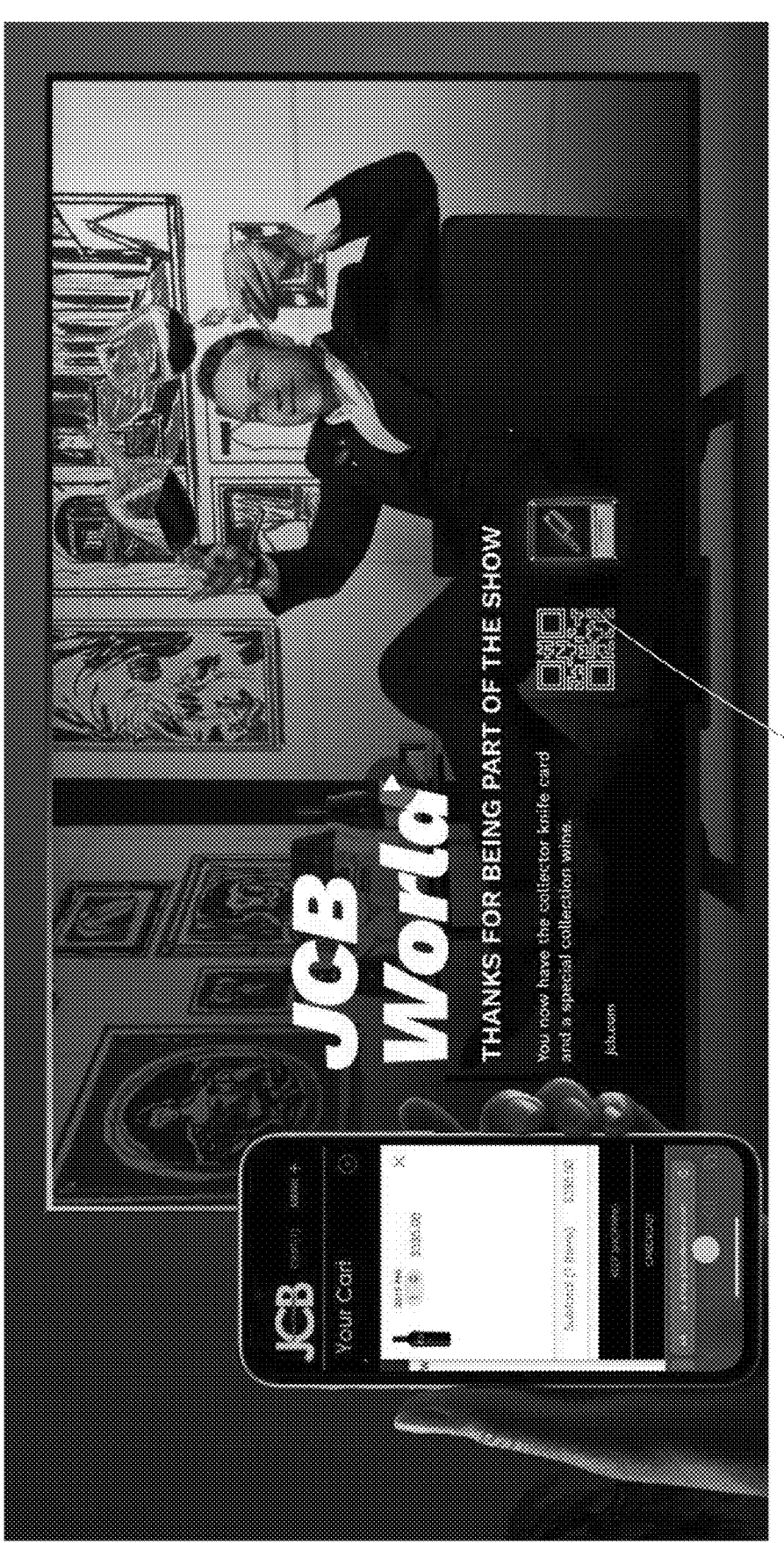

FIGS. 2B-2D summarize some unique features of the present interactive Web3 streaming network system. It should be noted that the features included in these figures merely illustrate a non-exclusive list of features and advantages, and there are other advantages described in this disclosure. The present participatory content platform or interactive Web3 streaming network system, as shown in FIG. 2B, can be a fan-driven entertainment network, which supports interactive live and pre-recorded programs, provides NFT network membership benefits, and digitally delivers benefits to fans. The network content can be programmed with creators, and audience growth and network effects are built in the platform.

The present disclosure provides an end-to-end platform to empower creators to create, broadcast, record, distribute, and monetize online communications to promote effective and interesting discourse. Instead of one-way content generation without audience collaboration in existing content providing systems, the techniques described herein detect, analyze, and understand how the audience is reacting to communication sessions, and, therefore, generate quality content that is most attractive to the audience. Since the audience reaction analysis is implemented in real time when the audience is consuming the live communication session, the techniques described herein can improve the content quality on the fly. In addition, the techniques described herein use a combination of editorial and machine learning approaches, which not only surface high-quality content users but also continue to train and learn the content, thereby improving content generation over time. Further, based on understanding and learning from the audience reaction data, the techniques described herein can make hit prediction analytics to obtain the likelihood that the created content becomes a hit. Moreover, the techniques described herein provide analytics for creators and speakers to better understand what content to continue creating or to avoid, thereby increasing audience engagement.

In addition to intelligent content creation, the techniques described herein also support efficient and effective content publication, distribution, and monetization. For example, the techniques described herein allow the content to be distributed to multiple platforms live and on-demand. In many cases, the distribution operation is as simple as just one tap. The techniques described herein allow the content to be viewed without leaving the present platform, for example, viewing an article while listening to the communication session at the same time on the one platform, thereby the operational overhead (e.g., additional network and computer resource usage, extra processing time, etc.) are reduced. Furthermore, the techniques described herein accommodate a feedback/insight loop mechanism that improves the accuracy, reliability, and flexibility of the system over time.

Advantageously, the present platform supports a Web3 content studio based at least on blockchain and NFT techniques. The tactile platform allows content creators to hear and see how their audiences are responding to their content, which is as close to being in real life as an actual studio can get. Creators and audiences no longer communicate through middle platforms (e.g., social network platforms). Therefore the audience reach may be maximized. Creators own their own audiences and will not lose any audience even if they leave a particular platform. The audience who changes the platform will also not lose their virtual assets since these assets are stored in the blockchain. Therefore there are incentives for creators to generate better content and for the audience to engage more in content generation. While viewers in current content management systems already had some degree of input within individual episodes of a communication session (e.g., an entertainment show), the NFTs and direct collaboration between creators and their communities take this to a new level, where audiences can impact the entire creator team's strategy. This not only enables quality content generation but also reduces production overheads.

The present interactive Web3 streaming network system, as shown in FIG. 2C, can also evolve and enhance the consumption experience. For example, the present system can support video consumption like Tik-Tok® for all content forms, layer commerce on top of content seamlessly, provide on-demand content interactively with clips and reactions, and serve swipable (e.g., left to right) network and series content, etc. Like Tik-Tok®, the present system allows a creator to upload his/her recorded videos directly to the platform, where the creator can edit and add various types of effects as desired. When a creator is interested in collaborating with fans or other creators for making videos, the creator can produce good quality content using the present system regardless where the fans or other creators are located. The content creation can be made much simpler and interactive.

By allowing fans and audiences to engage with their favorite creators (e.g., athletes, celebrities) in a collaborative show, the present system can overlay e-commerce on top of user experience. As described in the cooking example of FIGS. 4A-4B below, a chef is interacting with audiences about how to cook while one of the audiences is actually cooking. The interaction from the audiences at least includes laughing, clapping, commenting (e.g., on the audience's cooking product) as if they were all in the same room. Both the chief and audiences are part of the show. With the interactive Web3 streaming network system, fans and audiences can also enjoy behind-the-scene access to their favorite creators (e.g., chefs, athletes, and stars) and enable the behind-the-scene activities to be part of a show or communication session in real-time (as described below in FIG. 11). In some embodiments, audiences may get tokens or rewards based on their participation in the communication sessions, for example, more participation triggers more rewards. The present system may also provide early community members with special rewards and exclusive access, including the ability to join in the production and content creation process. The present system may further allow the audience to purchase products or bid on membership for a network when participating in a network communication session. For example, as part of the show of "JCB World" depicted in FIG. 2D, an audience may purchase a special collection wine, e.g., using a quick response (QR) code 282. The present system protects commerce with barcode such as universal product code (UPC), QR code, datamatrix code, etc. Additionally, the present system allows creators to have complete control over distribution and monetization of their content without needing to rely on third-parties, which further solidifies the direct interaction and access that creators and fans want to experience. The commerce, therefore, can be layered on top of the content (e.g., participation) seamlessly.

The techniques described herein are typically implemented based on the communications between servers and mobile devices. The techniques improve the usefulness of the mobile communication facility. For example, if a communication session itself is not appropriate for presentation to a particular mobile device (e.g., with low communication facility such as bandwidth) due to its capacity limitation on display and/or computer characteristics, this communication session may be replaced by a highlighted, concise version that is appropriate for presentation to the mobile communication facility. In addition, before a user decides to join a communication session, the techniques described herein allow the user to listen to a short clip of a live communication session at a given moment instead of the whole long-form session, which not only guarantees the user to get the most accurate information, i.e., the real conversation at that moment but also increases the mobile communication facility by eliminating unnecessary waste on computer resource usage and processing time/power. The present system creates a new format of communication sessions where audiences are in the creator's room, and the content is interactive with clips and reactions. Since mobile devices (e.g., smart phone) may be used to browse, discover, or select content, the interactions with content can be easy and efficient by leveraging the strong interactive interfaces of the mobile devices. For example, a simple left-right sweep on a mobile phone screen may allow a user to switch between different content for viewing. This further improves user experiences.

The present system also provides full analytics to understand how audiences are reacting to content in real-time which can also be leveraged as a development tool to pilot concepts before investing further in production. The present system allows the creator to actually own their content, audience, and analytics such that they can distribute the content everywhere and monetize everything. In other words, the audience growth and network effects are built in the present system.

In some embodiments, the present platform-oriented approach is based on APIs and software developer kits (SDKs). For example, a third-party website may include widgets and/or links on its own website to start a communication session. The third-party website may tailor the communication session that it drives to the platform through the SDK tools. As a result, the content of a communication session may be published across platforms. A communication session experience may be embedded in any website, and also rich media may be embedded in the communication session. Further, authentication information associated with users may be passed to various applications from the communication session. In some embodiments, the third-party website may communicate with data server 120 to generate and manage the content of a communication session, where the functionalities of data server 120 will be described in detail in FIGS. 3-14.

Content Management

Figure 3:
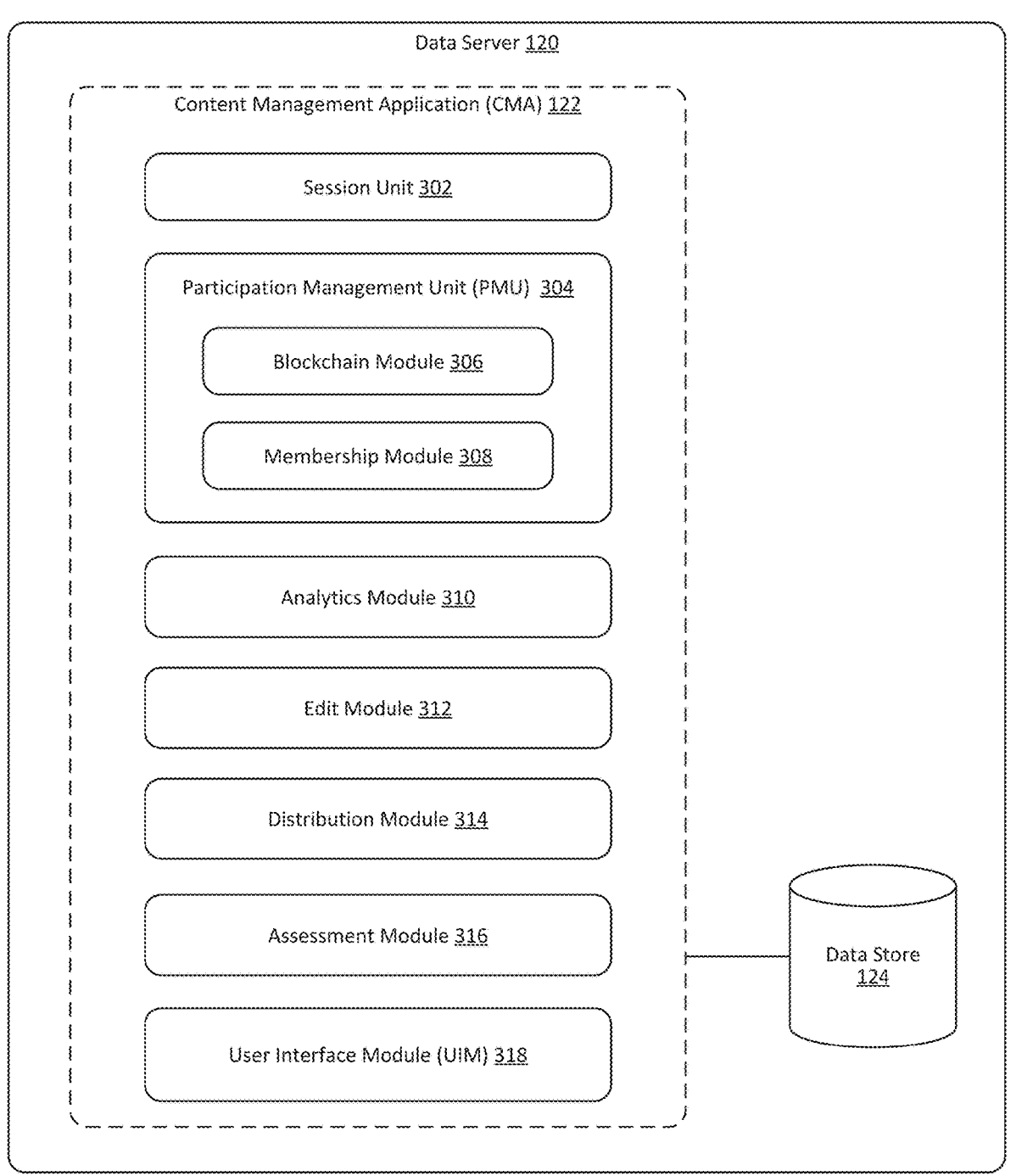
FIG. 3 is a server used as part of an interactive Web3 streaming network system for managing collaborative and participatory content using the methods described herein, according to some embodiments.

In some embodiments, FIG. 3 depicts selective components of data server 120 used to perform the functionalities described herein, for example, operations of process 200. Data server 120 may include additional components not shown in FIG. 3. These additional components are omitted merely for simplicity. These additional components may include, but are not limited to, computer processing units (CPUs), graphical processing units (GPUs), memory banks, graphic adaptors, external ports and connections, peripherals, power supplies, etc., required for the operation of data server 120. The aforementioned additional components and other components, required for the operation of data server 120 are within the spirit and the scope of this disclosure.

In the illustrated embodiment of FIG. 3, data server 120 includes a content management application (CMA) 122 and a data store 124. In some embodiments, CMA 122 is a Web3 content studio that provides creators with all the tools to develop, produce, distribute, and monetize quality content (e.g., live and interactive content) to reach the maximal size of audiences. In some embodiments, server-side CMA 122 may communicate with user 106 via software application 102 residing on the user device 104 to perform the functionalities described herein. Each user may have a public profile. When a user registers to software application 102, the user may also have an in-application profile. The profiles are used to present data received from the communications between software application 102 and server-side CMA 122. In some embodiments, CMA 122 includes one or more modules/units responsible for processing and analyzing the information received by data server 120. For example, the modules/units in CMA 122 may allow a creator to host a communication session, connect in real-time with the audience, and produce live content including user/audience participation.

In some embodiments, each module/unit of CMA 122 may store the data used and generated in performing the functionalities described herein in data store 124. Data store 124 may be categorized in different libraries (not shown). Each library stores one or more types of data used in implementing the methods described herein. By way of example and not limitation, each library can be a hard disk drive (HDD), a solid-state drive (SSD), a memory bank, or another suitable storage medium to which other components of data server 120 have read and write access. In some embodiments, data store 124 may be communicatively connected with data storage 124 or data storage 132 for data storing and retrieving.

In some embodiments, CMA 122 of data server 120 includes a session unit 302, a participation management unit (PMU) 304, an analytics module 310, an edit module 312, a distribution module 314, an assessment module 316, and a user interface module (UIM) 318. In some embodiments, CMA 122 of data server 120 may include only a subset of the aforementioned units/modules, and additional modules/units may be present on other servers communicatively coupled to data server 120. For example, session unit 302 may be deployed on separate servers (including data server 120) that are communicatively coupled to each other. All possible permutations and combinations, including the ones described above, are within the spirit and the scope of this disclosure.

Conducting Communication Session

Session unit 302 may allow creators and users/audiences to connect and interact in an online communication session. Session unit 302 may also communicate with other modules/units (e.g., PMU 304) of CMA 122 to control and monitor the progress of the communication session, such that attractive content (e.g., including user participation) may be generated and directly delivered to audiences.

In some embodiments, session unit 302 may communicate with UIM 318 to provide graphical user interfaces (GUIs) and tools for a creator to create a communication session (e.g., an entertainment show) and invite users to join the communication session. The users may be co-creators, speakers, audience, or any other users. In some embodiments, a snippet (e.g., preview, highlight) may be provided for a user to determine whether to consume or participate in the communication session. Session unit 302 may allow a creator to generate the snippet before, during, and after a live communication session. For example, session unit 302, in communication with other modules of CMA 122, may automatically transcribe the communication session in real time and/or leverage various types of insights derived from the communication session, such that a snippet can be generated, during the live communication session, to accurately reflect the content of the communication session at a given moment. Session unit 302 may also allow a user to join the communication session through one tab click, responsive to receiving the invitation or to search the communication session according to a topic of interest.

During the communication session, session unit 302 together with PMU 304, UIM 318, and other modules/units may generate and provide auditoriums for users to interact and participate in the communication session. For example, users may speak on a virtual stage of the communication session, select an emoji to represent his/her feelings at a particular moment, ask questions, etc. An auditorium may be customized to include various widgets, background images, artifacts, injected audio, etc., based on the content provided in the communication session. More participatory features will be described below with reference to PMU 304 and analytics module 310. Session unit 302 may also communicate with other modules/units to control communication sessions in other ways, for example, using an artifact sharing system to enable users to view the content mentioned in a communication session without leaving the platform in which the communication session is being held, allowing a host (e.g., creator) to designate one or more producers to control users on stage (e.g., adding or removing speakers to or from a virtual stage of a show), enabling scheduling and RSVP for future communication sessions, sorting communication sessions (e.g., based on a quality score generated by analytics module 310), etc.

When a communication session is complete, session unit 302 may combine with distribution module 314 (described below) to help a creator to publish and distribute the communication session. For example, a creator may broadcast the content of the communication session to multiple platforms (e.g., to a linked platform such as YouTube), share the content with followers on a platform, set up alerts for future communications, etc. Additionally, the video and/or audio content can be automatically transcribed, is distributed based on real-time audience reactions and analytics, which will be described in more detail below.

Generating Web3 Content

CMA 122, in communication with software application 102 of user device 104, provides a virtual content studio/platform for creators to host live, interactive communication sessions. Using the tools and/or GUIs provided by session unit 302, PMU 304, and other units/modules of CMA 122, creators such as podcasters, authors, musicians, TV personalities, comedians, etc., may create, share, and monetize live sessions with elements designed to keep audiences highly engaged. The communication sessions may be video shows, audio-only shows, or any other types of shows.

PMU 304, in communication work with session unit 302, may allow audiences to participate in communication sessions as co-creators or owners to play a part in the content generation process. Online audiences may two-way communicate with hosts (e.g., creators) and each other, whereas the existing content generation systems support only one-way communication. For example, using the existing systems, the audience in a crime show may share their conundrums, and hosts/creators help them be solved. PMU's 304 two-way communication support, however, allows participatory entertainment. That is, a host/creator may bring the audience to the scene of the crime, where armchair sleuths could presumably help hunt for clues in a crowd-sourced investigation. In another example, PMU 304 may allow a creator to conduct real-time questions and answers (Q&As) with their audience in a communication session, such that viewers/audiences can comment and ask questions in a real-time manner.

PMU 304 may also control and monitor user participation in a communication session and collect interaction data for generating virtual content including user participation. For example, PMU 304 may instruct creators to set up access conditions to view and/or participate in the communication session. When audiences react, for example, with a heart-eye emoji, raised-hands emoji, brain-exploding emoji, or any other expressions in a digital library, PMU 304 may communicate with other modules/units to generate feedback/insights and/or adjust the content of the communication session in real time. For example, if a number of audiences (e.g., greater than 10) raised their hands virtually within a short period (e.g., less than 5 minutes), PMU 304 may offer an option for the creator to add a new Q&A section.

In some embodiments, PMU 304 allows the creators to invite individual audiences "up on stage" to join the hosts from the corresponding user devices (e.g., their smartphones). For example, in the Q&A communication, PMU 304 may allow a creator to select and bring some persons from the audience up on the virtual stage for real-time discussions. PMU 304, therefore, enables creators to do live performances while interacting virtually with their audiences.

In some embodiments, PMU 304 also collects and feeds user participation or interaction data to analytics module 310 for generating analytics, and in turn, receives and leverages the generated analytics to adjust how audiences are engaging with content. PMU 304 may prioritize who can get access to the participation in a communication session based on how the audiences react to the content when they consume communication session(s) (e.g., the level of engagement, sentiment). For example, superfans or subscribers may get priority. PMU 304 may also prioritize an individual (e.g., active new user) based on the analytics associated with an ongoing communication generated in real time.

In some embodiments, PMU 304 includes a blockchain module 306 and a membership module 308. Blockchain module 306 is responsible for increasing user participation or interactions in communication sessions through the use of blockchain. Based at least on the blockchain, the CMU 122 is built into an interactive Web3 content studio that puts the power of a production studio in the palm of a creator's hand to create quality content with their audiences. Blockchain module 306 along with other components of the Web3 content studio allows creators to launch their networks or brands. These unique networks, featuring non-fungible tokens (NFT)-powered memberships (described below with reference to membership module 308), will allow creators to engage with their fans in a more interconnected manner. As a result, creators are able to bring both their work products and their communities to Web3.

The current world wide web is monopolized by large technology companies, and users rely on these companies to best serve their interests. The new Web3 uses blockchains, cryptocurrencies, and NFTs to give power back to the users in the form of ownership, i.e., to allow the web to be built, operated, and owned by its users. The decentralization, at least through blockchain module 306 and membership module 308, enables creators to engage, interact and monetize their work without any middlemen. In other words, by giving creators all the tools they need to develop, produce, distribute, and monetize quality content, various middlemen are cut off. As a result, creators own 100% of their content and audience relationships. A creator used to have 500 YouTube® fans and 500 Twitter® fans. Now, the creator has 1000 fans regardless of whether the creator leaves these platforms (e.g., closing his/her accounts on these platforms). Blockchain module 306 stores the data associated with the creator in the blockchain. The data includes the content data, interaction data, audience relationship data, and any other data related to content generation. The creator will not lose any data including his/her reputation. Additionally, blockchain module 306 uses tokens such as Ethereum to directly provide payment to a creator in a web browser, which requires no trusted third party (e.g., banks) and payment processors.

Figure 4B:
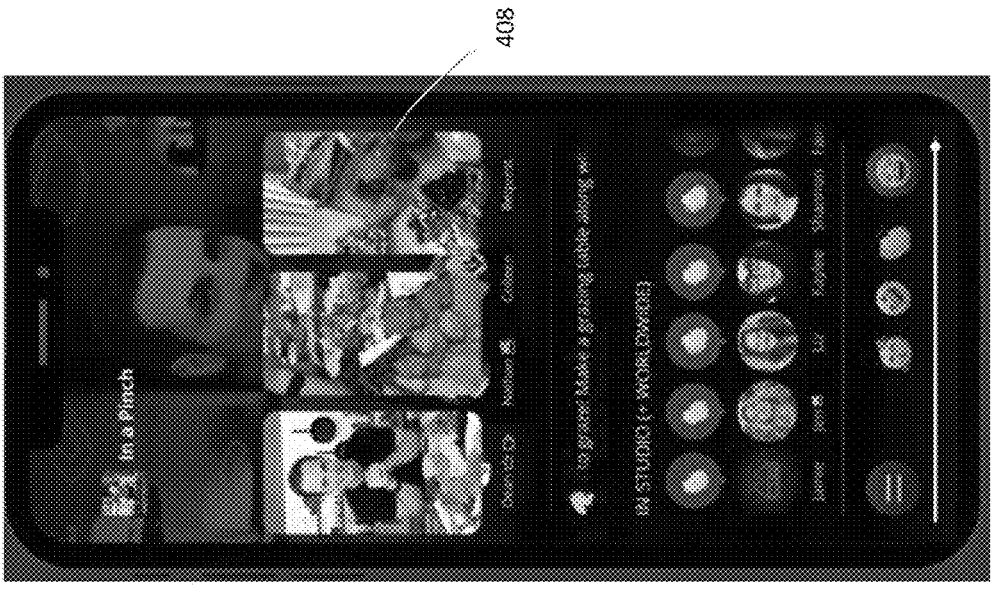
FIGS. 4A and 4B illustrate an example communication session, according to some embodiments.
Figure 4A:
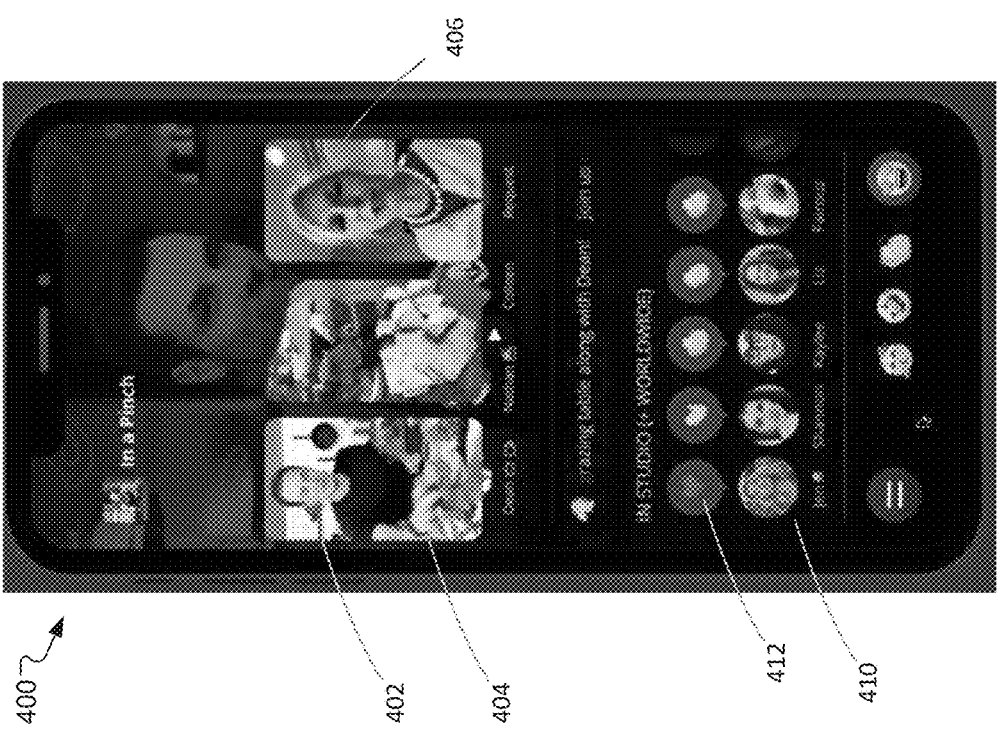

An example communication session 400, e.g., a cooking show, is shown in FIGS. 4A and 4B. CMA 122, based on functionalities of its components such as session unit 302, PMU 304, and blockchain module 306, works as a virtual production studio to enable creators and audiences together to create innovative video and/or audio sessions/shows as depicted in FIG. 4A. In this example, not only the chef 402 is hosting the show and cooking at 404, a viewer 406 is also brought up to the virtual stage of the show, where the viewer is cooking along with the chef, asking him about ingredients, cooking time, cooking tips or other questions in real time. The viewer may also turn on her camera to show her work product (e.g., cooked food) at 408 of FIG. 4B. In some embodiments, the chef is provided audience analytics such that he can pre-select a superfan to join the cook with him. In other embodiments, the chef may also use the analytics to prioritize the audience to join the virtual stage of the show on the fly.

Additionally, audience 410 may be involved in the show at least by using emojis 412. These emojis indicate the sentiment of the audience (e.g., listeners or viewers) toward the content being broadcast at that moment in time. Using these emojis, the audience may laugh, clap, applaud, etc., as if they are in the same location (e.g., the same kitchen) with the chef. The audience may react to the content of a live show to receive feedback from others in real time. As the show is progressing, the creator or host chef may add, remove, or modify the content of this ongoing show based on the real-time reaction of the audience, and the audience may further engage and respond to the modified show. Therefore, both the host and the audience work together to create the most attractive show. The audience is also the co-creator of the show. By reducing the overhead to create the communication sessions or show and creating a novel format/way to interact with audiences in the sessions, the present invention reduces the computer and network resources that are otherwise used to provide quality content. For example, there is no need for additional search to obtain feedback on the shows, or for additional effort to improve the subsequent shows based on the feedback.

Referring back to FIG. 3, membership module 308 is used to enable NFT-powered memberships. The membership benefits in various ways. For audiences (e.g., members of the Oprah Winfrey Network), not only they may have the opportunity to participate in the creation of the show in the writer's room and/or be part of the production of the series, but also they may be able to have input on the evolution of the network and receive rewards for the awareness and growth driven by the members. The members provide quality content (e.g., contributing good ideas for future shows) and increase their membership value with it. On the other hand, the creators may launch fan-driven networks with NFT-powered memberships, subscriptions, branded content integrations, and third party platform advertising, etc. The content, generated by creators and their communities, can be directly supported by brands. Creators, communities (e.g., audiences), and/or brands are directly connected, fully aligned, and collaborating to create interactive video and/or audio content. This leads to a new network, i.e., a first participatory network with newly-formatted content.

An NFT is a financial security consisting of digital data stored in a blockchain. The ownership of an NFT is recorded in the blockchain, and may be transferred by the owner, allowing NFTs to be sold and traded. In some embodiments, membership module 308 may use NFTs as membership cards for audiences (e.g., superfans) to access the production process of a communication session as it happens, and to even influence the creation of the communication session.

NFTs typically include references to digital assets such as photos, videos, and audio. Creators may make the NFTs and attach royalties to the NFTs. Membership module 308 allows the members to directly own the digital assets through NFTs. Suppose a user obtains a digital reward through participating in and/or contributing to the creation of a communication session when accessing the communication session from a particular platform (e.g., Twitter). This digital reward is tied to the user's account on the platform. If the platform deletes the user's account, the user will lose the reward. If the user stops using the platform, the user also loses the value of the digital reward. However, through NFTs, membership module 308 allows the user/member to sell or trade the reward and recoup its value when the user leaves the particular platform. The platform no longer has the power to take away the user's ownership. Moreover, in some embodiments, membership module 308 along with blockchain module 306 may control the member's digital identity with an Ethereum address to provide a single login across platforms, such that the members can join and participate in communication sessions with a single secure account regardless of where they are accessing the sessions. The decentralized and platform-agnostic feature not only removes the middlemen between the audience and creators, but also optimizes user reach.

In some embodiments, membership module 308 may support membership level of access. Depending on differ levels of membership to a network, a member may be able to obtain a virtual version of a personal license, own a virtual seat in that network (e.g., in the metaverse shown in FIG. 11), sell the license to others, etc. In some embodiments, membership module 308 may provide early access to online services, goods, and other merchandise to members with different memberships. A use may register as one type of members, e.g., silver, gold, or platinum member to have different levels of access to a network. A use may also promote his/her membership level to enjoy additional benefits from an increasing access level, e.g., by extra payment or by rewards from extra participation in communication sessions. For example, an audience may get participation awards, e.g., getting a gold star. When an audience bring in a creator for the network, the audience may get 10 gold stars. The gold stars are tallied for a certain period (e.g., each month), an award is given to the audience based on the total number of the stars. In this way, audiences can participate in driving growth on the interactive Web3 streaming platform for the content creator.

In addition to protecting or gating the content of a communication session based on user participation, membership module 308 may also gate the content based on the level of access. This level of access may be network specific. For example, if a gold member is invited to the stage of a communication session of the network, a platinum member with a higher level of access should also be included in this session.

Figure 5B:
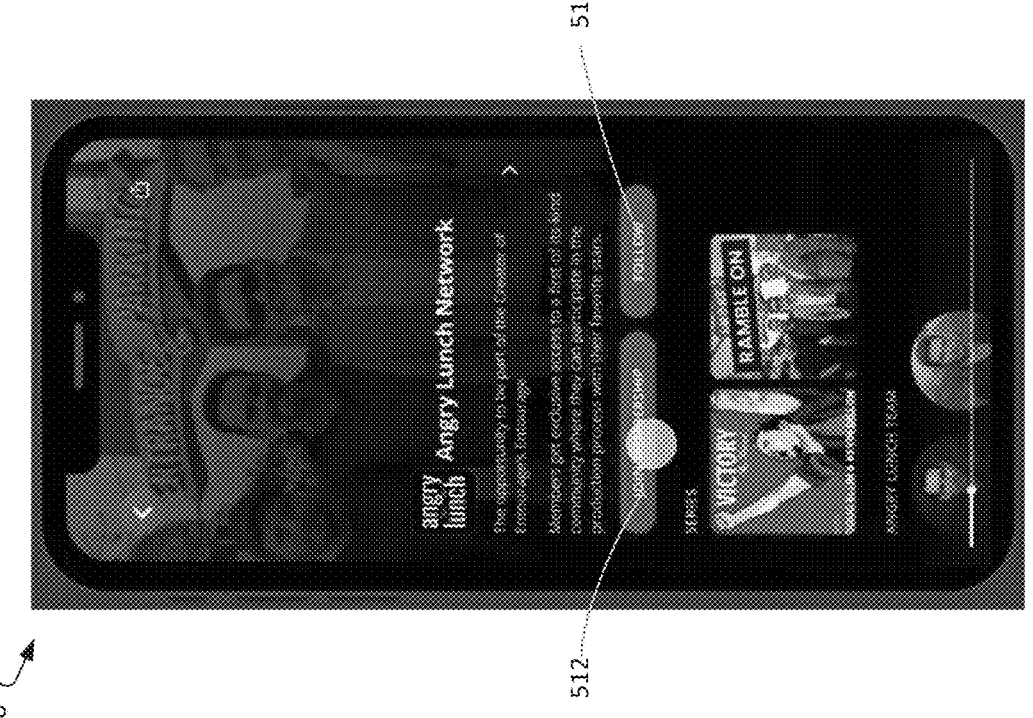
FIGS. 5A-5E illustrate example user interfaces for a user to join a membership, according to some embodiments.
Figure 5A:
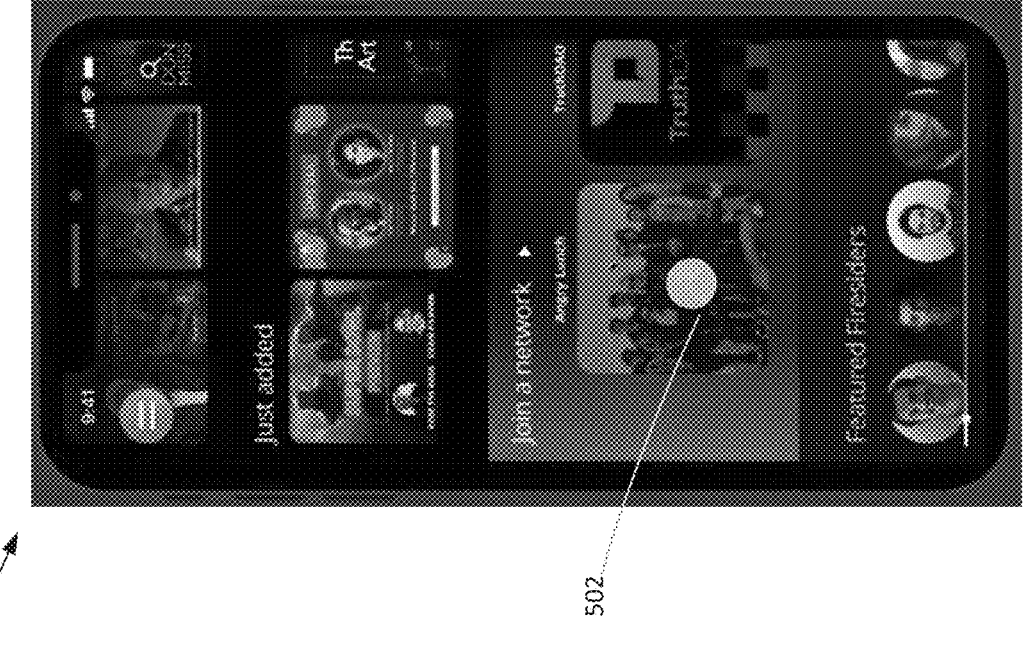
Figure 5E:
Figure 5D:
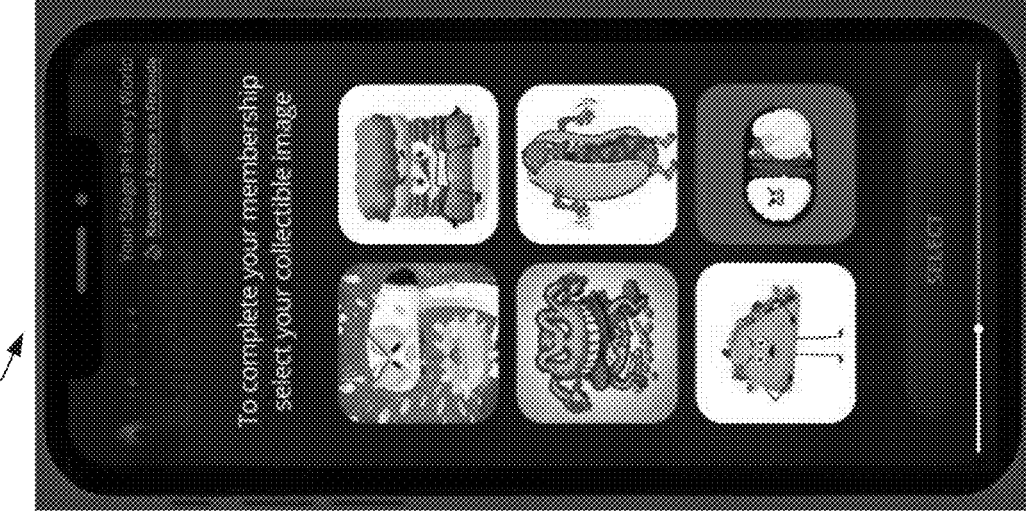
Figure 5D:

By leveraging the benefits of NFTs and unique membership level of access, membership module 308 provides an easy and simple way for audiences to become members, based on using the software application 102 associated with user device 104 (e.g., an app installed on users' phones). FIGS. 5A-5E illustrate example user interfaces for a user/audience to join a membership, according to some embodiments. In the example interface 500 of FIG. 5A, membership module 308 cooperates with UIM 318 to provide users/audience an option to join a network of a communication session (e.g., the "Angry Lunch" show). When the user selects option 502 "join a network," an interface 510 in FIG. 5B is prompted to the user. In the depicted embodiment, membership module 308 may accept the user's selection of the "join membership" option 512 to become a member of the show. Membership module 308 may also provide an alternative "follow" option 514 for the user to follow the show.

Figure 5C:
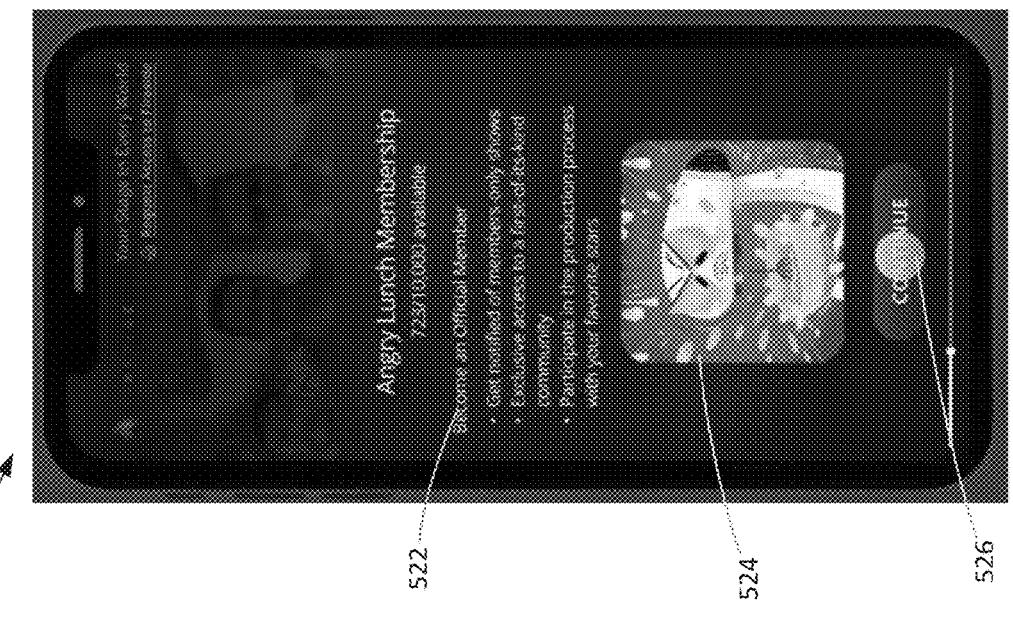

Responsive to the user selecting to join the membership, an interface 520 in FIG. 5C is generated, where the user can view the membership availability information and essential member benefits in 522. For example, a member can be notified of members-only communication sessions, get exclusive access to the community of the communication sessions, participate in the production process of communication sessions, etc. Additionally, a sample membership image 524 is displayed to the user. Once the user selects the "continue" option 526, a list of six collectible images is automatically generated and presented to the user in the interface 530 of FIG. 5D. When the user selects one image in the list as his/her membership image, an interface 540 of FIG. 5E will pop up to remind the user of the completion of the membership registration process. The user or member may start to enjoy his/her membership benefits.

It should be noted that, during the entire membership registration process, membership module 308 does not reveal any NFT-related information to the user. Upon receiving the user's selection of membership image in interface 530 of FIG. 5D, membership module 308 may instruct blockchain module 306 to create a digital wallet for the user using blockchain technology. The digital wallet allows the user to store and manage his/her virtual assets (e.g., cryptocurrencies). Transactions made with a digital/blockchain wallet are verified and tracked, ensuring security and anonymity. However, the user using the digital wallet may easily obtain the membership benefits without knowing any underneath complexity.

Users access the CMA 122 or Web3 virtual studio through the software application 102 of user device 104. Generally, each user has an in-application profile and/or a public profile. These profiles, in particular, the in-application profile is optimized to show user activities in the software application, including how the user-contributed and/or participated in content generation associated with communication sessions, how and in what way the user consumed content, etc. This profile may also link the user to a search engine (e.g., Google search) to search and discover specific content. Once the user joins the membership as shown in interface 540 of FIG. 5E, membership module 308 may update at least the in-application profile with the new membership status and membership image.

Figure 6:
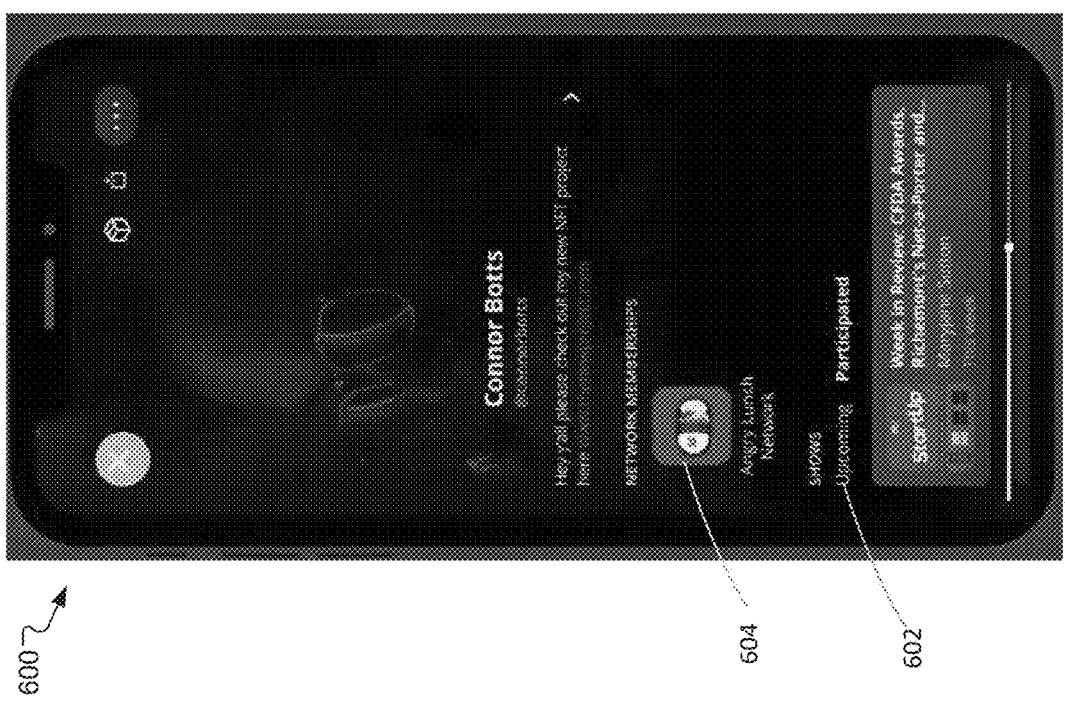
FIG. 6 illustrates an example user interface for a content creator to deliver membership benefits to members, according to some embodiments.

FIG. 6 illustrates an example user interface 600 where a content creator may deliver membership benefits to his/her members. For example, the creator may show upcoming communication sessions/shows, including exclusive pre-recorded shows, to the members in 602. Also, a selection 604 may direct the creator to the virtual content studio to start recording new sessions in "Angry Lunch Network," and to let members input on the creator's content creation process. In such scenarios, the members may have behind-the-scene access and participate in the behind-the-scene activities, e.g., content creation process. Such participation can be converted to part of the communication session or watch along content. The new communication sessions may be available for the public, followers, or only NFT members, etc. The creator may make his/her availability preferences based on the analytics (e.g., feedback and insights in real-time or over time). Other creator preferences and/or configurations enabled by membership module 308 include allowing members to scan a quick response (QR) code to join the membership, using a push button to send award token(s) to the members (e.g., such that the member can buy NFTs).

Using Analytics

Figure 7:
FIG. 7 illustrates various ways that users can use analytics to improve content generation and user experience, according to some embodiments.

FIG. 7 lists various ways that users can use analytics to improve content generation and user experience. In some embodiments, based on how audiences are reacting as they consume the content, the CMA 122 would provide hit prediction insights. It makes hit prediction about the likelihood that a created content becomes a hit. For example, the CMA 122 may help creators and speakers to understand audience and content that is resonating most with them. With such analytics, the creators and speakers may know what content to continue creating or to avoid, thereby increasing audience engagement and increasing the likelihood that the content becomes a hit. The CMA 122 also allows the creators to edit transcript text, cut audio and video with one single tap, remove sound effects, embed advertisement slots for distribution, add trailers and bumpers to content, etc. In some embodiments, the CMA 122 may provide such functionalities through at least analytics module 310 and edit module 312 as describe below.

Determining Insight

Referring back to FIG. 3, analytics module 310 processes the data associated with one or more communication sessions to generate different types of insights. The data may be any type of data generated within a communication session such as text messages, voices, audio, emojis, gestures, etc. Analytics module 310 may generate insights respectively for creators, speakers, or other users. The insights may be based on understanding audience and content and used to enhance content editing and generation. The insights may also be based on the analysis of content replay and used to improve content generation over time.

In some embodiments, analytics module 310 may collect the sentiments (e.g., emojis) from the audience, analyze the sentiment data, and determine feedback to provide to the creator(s) and/or speaker(s) of the communication session in near real time. Analytics module 310 may also analyze the audience sentiments to determine one or more segments of the communication session that have the most or greatest audience engagement. Therefore, analytics module 310 may timely provide a creator with feedback on the content. For example, when a large number of negative sentiments (e.g., above a pre-defined threshold) are being expressed by the audience members, analytics module 310 may cooperate with session unit 302 to moderate the communication session (e.g., removing a user from the stage).

In some embodiments, analytics module 310 may assign a sentiment value to each user reaction and combine these sentiment values into a score. This score may be presented graphically to creators over time such that the creators can review live or historical sentiment when driving decisions about future content generation.

In some embodiments, when communicating with edit module 312 to edit the content with audio filter(s), analytics module 310 may use one or more custom algorithms to measure audience responses in the communication session and equate the responses to a sound impact in a live venue. A sound impact or effect is an artificially created or enhanced sound. In some embodiments, analytics module 310 may identify a type of audio/sound reactions from the audience responses, determine an amount of the type of audio reactions in a pre-defined time period, and determine, based on the determined amount, whether and to which sound effect this type of audio reactions may be categorized into. In other words, analytics module 310 may recognize and customize the differences between different amounts of audio reactions such as cheers, claps, laughing, celebration, etc. For example, when a user in the audience claps, analytics module 310 captures it and takes it as an individual clapping sound. When several users (e.g., above a first threshold) clap within a timeframe, e.g., five users clapped within one minute, analytics module 310 shifts the individual clapping sound to a round of applause. In some embodiments, analytics module 310 may also customize the same type of audio reactions based on the size of the audience. That is, analytics module 310 may determine two different sound effects when six people clapped among 6000 audiences and when five people clapped among 30 audiences. Analytics module 310 may also modify the first threshold for categorizing audio reactions according to the size of the audience.

In addition to an amount of the audio reactions, in some embodiments, analytics module 310 may customize audio reactions based on other criteria such as a participation rate, a location, etc. For example, analytics module 310 may give applause only if audience reactions, from one side/location of a debate, reach a customization threshold. Further, analytics module 310 applies different algorithms in customizing audio reactions depending on whether the communication session is held in a virtual indoor or outdoor environment. In other embodiments, analytics module 310 may change audience audio reactions to sound effects based on the distance of sound. In some scenarios, when an audience reacts in a communication session or a show, the audience sounds like he/she is far away from the stage. The audience's sound may be heard but is often taken as a distant noise. Analytics module 310 may customize these kinds of sounds by turning them into certain sound effects (e.g., laughing, clapping, etc.) that can be used in the show.

By mapping different audio reactions to different sound effects, analytics module 310 may create a custom sound board including the custom sound effects. In some embodiments, analytics module 310 may allow producers and creators to use the custom sound board during their communication sessions (e.g., shows) and when they react to the content. In other embodiments, analytics module 310 may also allow the audience and creators to record their own sound effects tracks and create their own custom sound boards.

In addition to the sentiment analysis, analytics module 310 may further analyze user interaction data (e.g., based on demographic information such as location, age, and education level) to identify user behavior patterns. For example, analytics module 310 may determine the average time that users spend on viewing different segments of the content of a communication session, location-based preference differences on content topics, etc. Analytics module 310 may also determine users' domain expertise in a topic area, e.g., based on the transcription and artifact information across multiple pieces of content, and identify a domain expert.

In some embodiments, analytics module 310 may use sentiment values, scores, and other data (e.g., user feedback, pattern data, demographic information) as input to one or more ML models and train the one or more ML models to perform analytics on the data associated with the communication session. The one or more models may be a logistic regression model, a support vector machine (SVM) model, a cluster model, etc.

In some embodiments, analytics module 310 may analyze audience/user interactions to generate at least live communication session insights, speaker insights, and replay insights. Each insight includes at least measurements of a set of metrics determined by analytics module 310. In some embodiments, analytics module 310 only provides the live communication session insights or content insights to creators, provides the speaker insights to speakers, and provides replay insights to both creators and speakers. Different types of insights are used to improve content quality and increase audience engagement in current and future content generation.

In some embodiments, analytics module 310 may generate content insights based on a set of metrics determined for a creator of a communications session. The set of metrics includes, but is not limited to: a total number of listeners or viewers, a number of shares, a number of broadcasts, a number of reactions, a number of speakers, percentiles of listen/view time by the audience, a number of new follows, average sentiment value/score, most and least engaged segments of the media stream/content of the communication session, sentiment levels across segments of the media stream/content of the communication session, demographic info such as location, etc.

In other embodiments, analytics module 310 may generate the speaker insights based on a set of metrics for a speaker of the communication session. The set of metrics includes, but is not limited to: how many listeners/viewers were most engaged, how many listeners/viewers were least engaged, a total number of listeners/viewers, a sentiment percentage, and an indication of how many speakers broadcasted the communication session, how many users shared the communication session on the platform, and how many new followers did the speaker obtain from the communication session, etc. Analytics module 310 may also provide the speaker a link to the segment(s) of the audio/video where the most engagements happen, such that the speaker may create a clip of the audio/video from the segment(s) that had the greatest audience engagement.

In yet other embodiments, analytics module 310 may communicate with assessment module 316 to collect feedback data after users view the replay of a communication session. Using the collected data, analytics module 310 may train one or more ML models to generate the replay insights based on a set of metrics determined for both the creator(s) and speaker(s) of the communication session. The set of metrics includes, but is not limited to an average listen time, users who followed the creator/speaker or requested access after listening to/viewing the replay, users who shared the replay, a number of replay shares, peak listens/views (e.g., portions of the communication session that are frequently listened to or viewed during the replays), when users stop listening or viewing (e.g., indicating the about when content or what types of content become less interesting), etc.

Figure 8B:
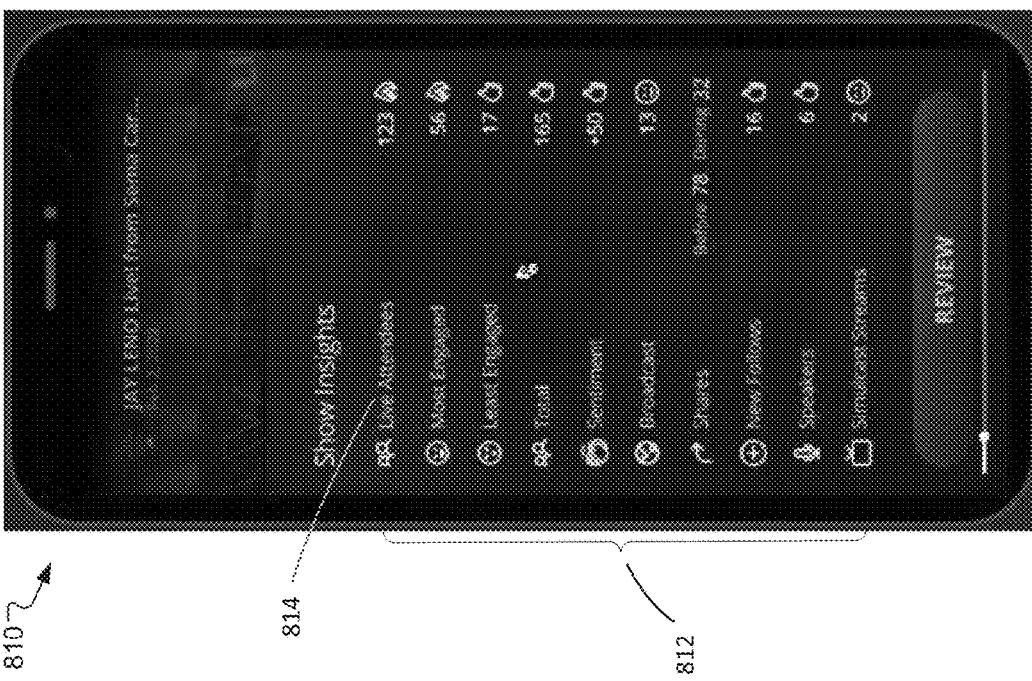
FIG. 8B illustrates an example user interface of insight summary generated for a communication session, according to some embodiments.
Figure 8A:
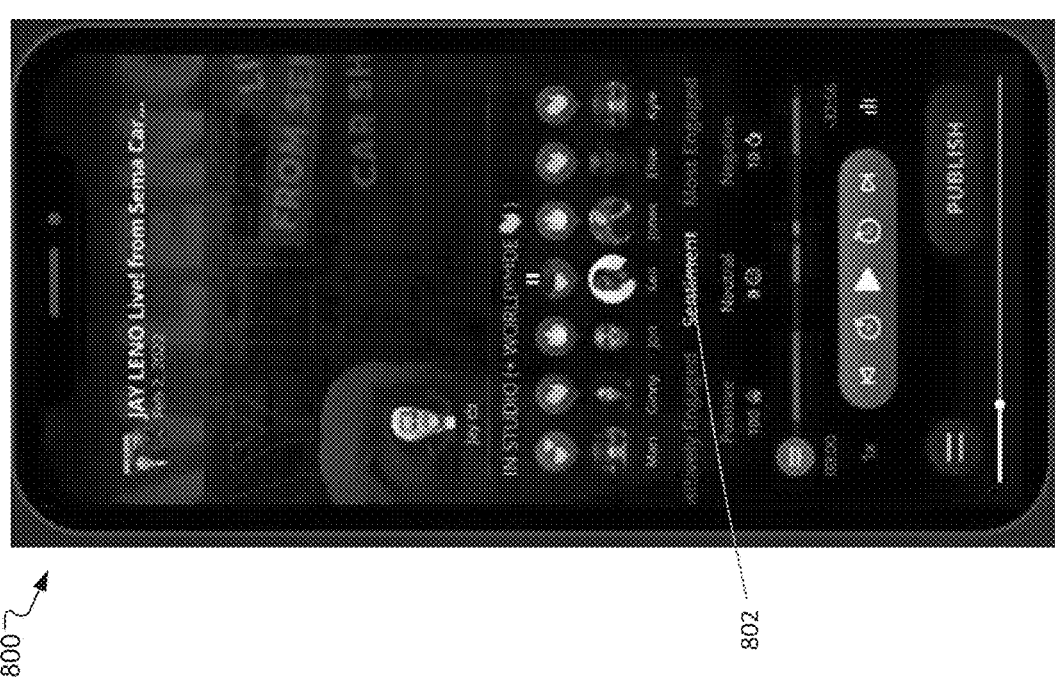
FIG. 8A illustrates an example description of a metric for a communication session, according to some embodiments.

In some embodiments, analytics module 310 may communicate with UIM 318 to present analytics/insights to creators and speakers for them to better understand what content to continue creating or to avoid in order to increase audience engagement. FIG. 8A shows a brief description of the metric for a communication session (e.g., "Jay Leno Live!" show) in an interface 800. As depicted, at a particular time in point, there are 100 positive, 0 neutral, and 10 negative sentiments 802 from audiences. This "sentiment" metric is measured and modified as the session is progressing. FIG. 8B illustrates an example user interface 810 of insight summary generated for a communication session, which may be presented to both the creator/host and speakers during and/or after the communication session. In some embodiments, the insight summary includes a list 812 of metrics 814. As depicted, metrics 814 that are associated with a live communication session and generated for a creator may be presented in order of priority as follows:

Live Attendees: a number of audiences in the communication session;

Most Engaged: a number of total reactions by unique/active users;

Least Engaged: a number of users that either left the communication session or did not react at all while listening/viewing the communication session;

Total: a number of total listeners/viewers, e.g., the highest number of a worldwide audience at any point of time during the communication session;

Sentiment: a percentage of positive emojis used in the communication session;

Broadcasts: a number of broadcasts during the communication session;

Shares: a number of users invited to the communication session by participants;

New Follows: a number of follows received during the communication session;

Speakers: a list of speakers in the communication session;

Simulcast streams: a number of streaming on multiple platforms simultaneously.

The example list 812 is not exclusive. Other metrics (e.g., average view/listen time) may also be measured and included in the list. In addition, analytics module 310 may allow a user to interact with each of the metrics, for example, checking which portion of the session that most people engaged, which portion receives the most negative sentiment, etc. In some embodiments, analytics module 310 may further analyze the communication session data to determine featured users, for example, the creators and speakers with the highest amount of replays, the user having most followers, the user having the highest overall engagement, the user having a maximal number of communication sessions, the user having the largest total amount of time (e.g., minutes, hours) of content created, the most active creators on the platform (e.g., based on the frequency of login and time using software application 102), a ratio between follower and engagement, etc. With the identification of featured users, e.g., heavy-hitting users who plan to participate in creators' future communication sessions, the creators may enhance their content generation and, in turn, encourage the participation of more creators.

Editing Content

Referring now to FIG. 3, edit module 312 allows the creator of a communication session to leverage and interact with the analytics/insights/metrics to edit the audio/video of the communication session prior to publishing or sharing the content.

Edit module 312 provides tools/GUIs for creators to edit the content in various ways, such as cutting audio and video clips, adding trailers and bumpers (e.g., image, text), removing sound effects, etc. In some embodiments, edit module 312 may allow creators to cut audio and video with a single tap. Edit module 312 also enables advertise embedding such that a number of advertising slots (e.g., up to 10) can be embedded in the content for distribution. Edit module 312 may further allow the creators to edit transcript text, where the transcript may be automatically generated during a live communication session. In some embodiments, edit module 312 may edit the transcript and remove the sound effect with one tap such that the edited content is natively formatted for one push distribution (e.g., when the content is distributed as a podcast).

In some embodiments, edit module 312 uses different filters, e.g., audio filters, and video filters, to edit the content of a communication session. For example, using an audio filter, edit module 312 may reduce the background noise, modulate voice, automatically censor the communication session (e.g., based on time-synchronized transcript), remove prolonged silences, remove filler words (e.g., um, ah, like), inject sounds like music or sound board noises, etc.

Figure 9B:
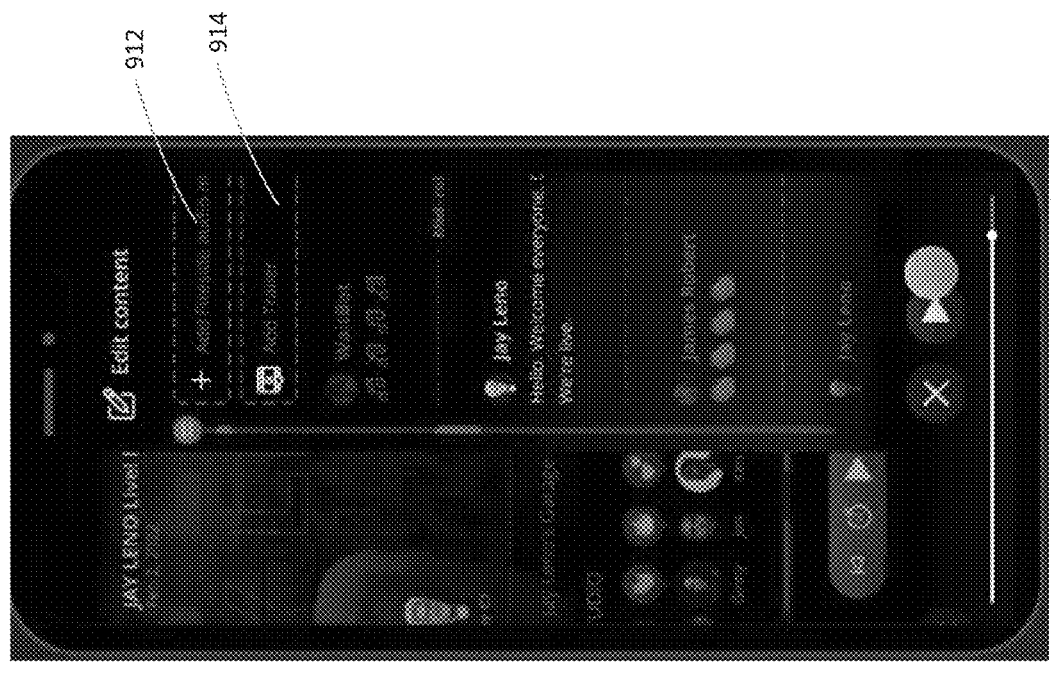
FIGS. 9A and 9B illustrate example user interfaces used by a creator to edit the content of a communication session, according to some embodiments.
Figure 9A:
Figure 9A:
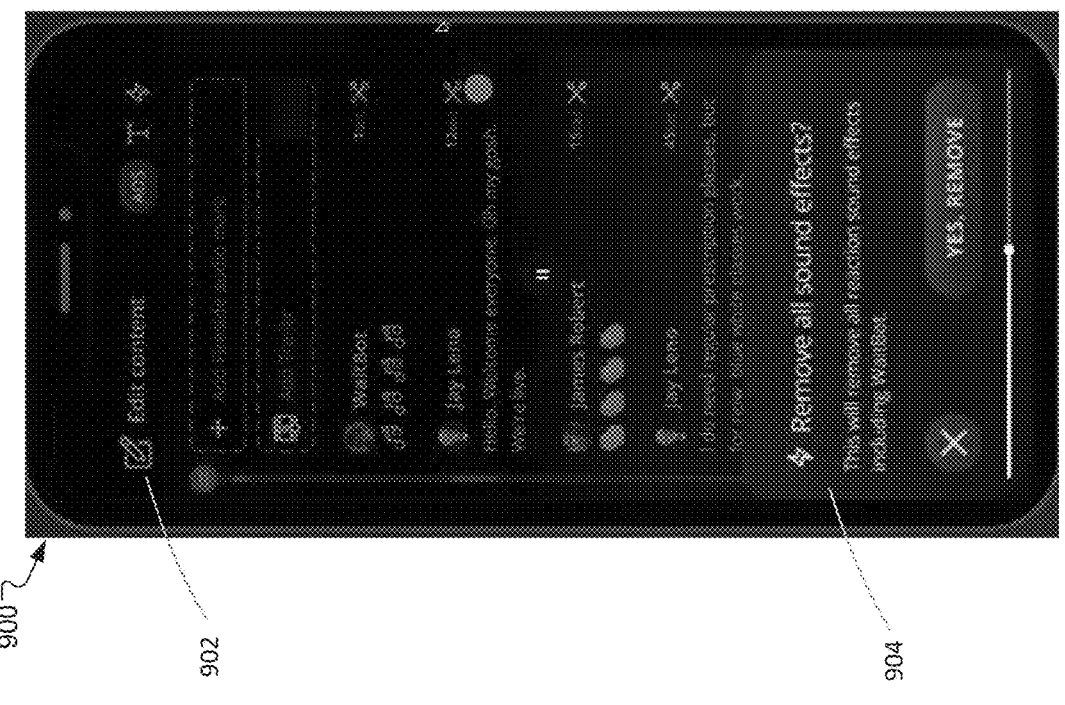

FIG. 9A illustrates an interface 900 that a creator uses for editing the content of a communication session, e.g., by selecting "edit content" option 902. The creator may also select option 904 to remove all the sound effects, for example, a round of applause added when a number of user claps are received within a timeframe. Edit module 312 may allow the creator to use or remove the round of applause when editing the content. In interface 910 of FIG. 9B, a creator may add an audio/video clip with options 912 and 914. Generally, creators understand the audience and content of the communication session that are resonating most with them based on the metrics/insights, and edit module 312 provides tools/GUIs for the creators to edit the content accordingly.

In some embodiments, the content including high levels of interactions/participation in communication sessions creates new content formats. The new formats may include a first interactive home design show, a first talent management company reality show, a first interactive home flipping show, a first interactive baking show, a first cookalong show, a first interface true crime show, a first interactive talk show, and a first live interactive crowd-sourced improve series, etc. For example, in the communication session shown in FIGS. 4A and 4B, an audience is cooking along with the chef, displaying her food to the audience, and receiving comments from other attendees, etc. This turns a traditional cooking show into a participatory cookalong show that allows the host and audience to connect in a new interactive manner (e.g., two-way communication).

Once a creator has edited and published the communication session, the attendees of the communication session may receive an in-application or in-app notification such that they may share the communication session externally.

Content Distribution

Figure 10:
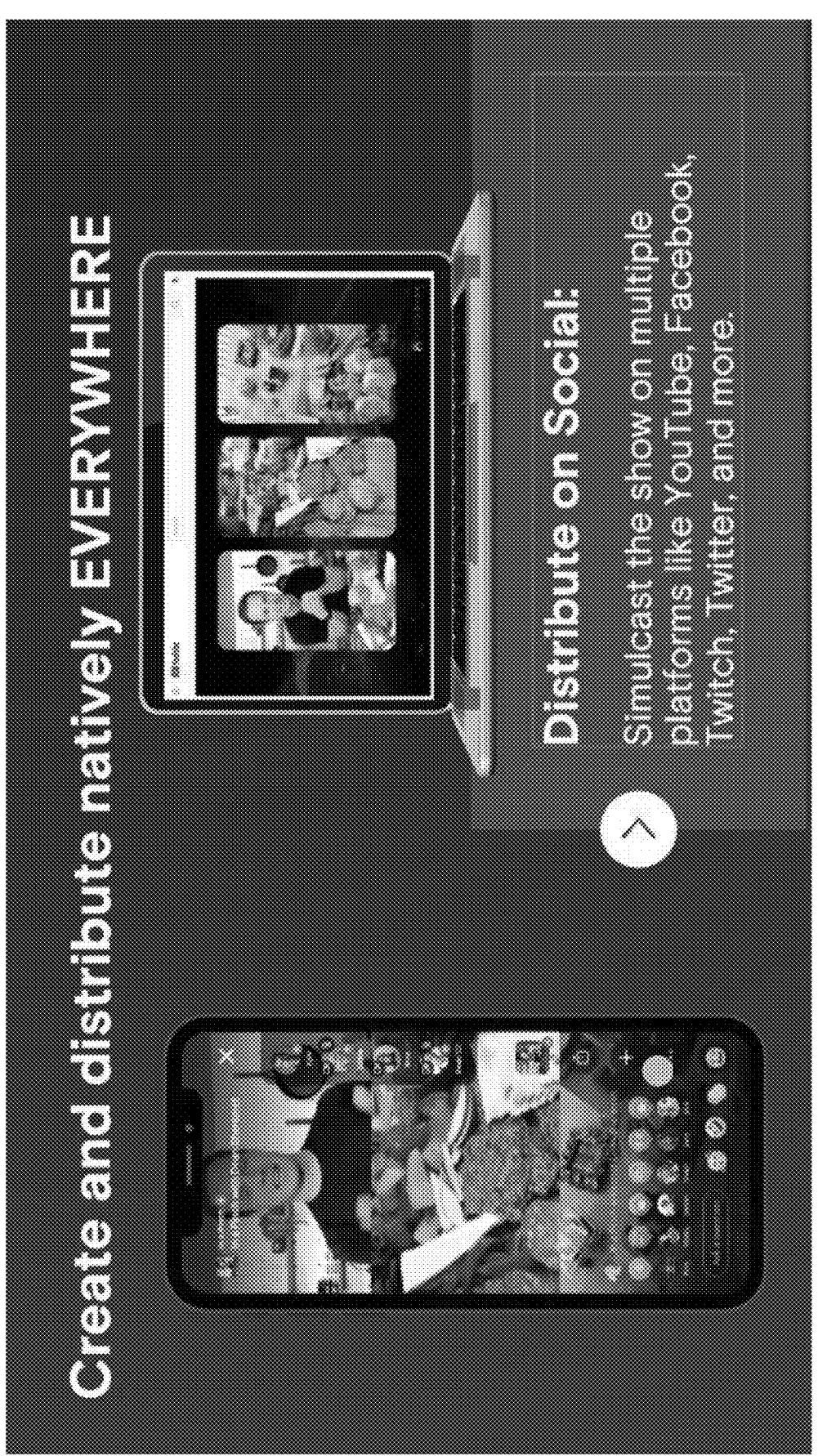
FIG. 10 illustrates various ways for distributing content of a communication session, according to some embodiments.

As depicted in FIG. 10, distribution module 314 allows communication sessions to be distributed everywhere, e.g., live or on-demand, to traditional social or over-the-top (OTT) services. In some embodiments, distribution module 314 may help users to simulcast communication sessions while recording live on a variety of platforms such as YouTube®, Facebook®, Twitter®, Twitch®, etc., or to broadcast the communication sessions without content downloading (e.g., turning the communication session into a shareable link via browser). Therefore, creators may have their own streaming platform, as well as control the content consumption without limitation.

Distribution module 314 also allows easy and convenient on-demand content distribution, that is, streaming pre-recorded content directly to audiences. For example, distribution module 314 may allow the communication session to be distributed as a podcast with one tap. Distribution module 314 may automatically share the content of the communication sessions across participants and host networks. In particular, distribution module 314 may distribute the content to millions of households on linear TV, e.g., with an ad-supported video-on-demand (AVOD) fast channel platform. AVOD is the backbone of many free streaming platforms, like Vudu®, Tubi®, and Samsung®. While AVOD hosts a variety of free on-demand content, this content is fully powered by advertisements, which offers creators another low-risk way to monetize their video/audio content.

Distribution module 314 integrates with other entities of the present platform to provide creators the ability to broadcast the content they create (e.g., live and recorded) to reach the largest number of consumers, that is, to use APIs and SDKs for embedding and starting content generation in multiple systems such as websites, metaverse, etc. The metaverse is a shared virtual three-dimensional (3D) world that is interactive, immersive, and collaborative. For example, distribution module 314 may syndicate the communication sessions created in the present platform to the metaverse and create a metastudio. In the metastudio, users in the metaverse can create content and communication session with real-time feedback from the audience and allow them to join the virtual stage and be in the show.

Unlike traditional media and entertainment platforms that have provided fans with the same static and one-sided content, the metastudio offers audiences a truly unique and immersive experience. For example, creators can bring the audience along with them on location for interactive, live investigations where audiences join the stage via both video and audio for real-time discussions and Q&A. As shown in FIGS. 4A-4B and FIGS. 12A-12G (discussed below), the chef and fans/audiences are placed in a virtual kitchen of a metastudio, where the chef, the cooking audience, and other audiences talk, laugh, clap, comment, and even check the dish the audience cooked during the show, as if they were all in the kitchen.

Figure 11:
FIG. 11 illustrates an example 3D virtual studio, according to some embodiments.

The interactive Web3 streaming network system described herein also allows fans and audiences to enjoy behind-the-scene access to their favorite chefs, athletes, and stars and enable them to be part of a show or communication session in real-time. FIG. 11 illustrates an example 3D virtual studio or metastudio 1100. The CMA 122, including session unit 302, PMU 304, and analytics module 310, builds a virtual content studio for collaborating the work of creators and audiences. Rather than interacting with each other in a 2D space, this studio advantageously provides the 3D virtual space/metaverse of 900 in FIG. 11 for audiences (e.g., members) and creators to gather together. Creators may work with members in this studio to create stories. Members may communicate with other community members, consume content, get rewards for consuming content and/or participating in content creation, use the rewards for engaging in commerce. In this virtual metaverse, it appears that some creators/members may be sitting at table 1102 to brainstorm ideas, others are watching and discussing the "Victory" show 1104 together (e.g., based on the watchalong feature described below), and yet others are purchasing NFTs such as NFT pictures 1106, etc.

Distribution module 314 may allow creators and/or speakers to share content with followers and members, or share the content externally on third-party platforms. An in-app notification may be generated and sent to followers and members to notify them of the new content. In some embodiments, distribution module 314 may also send an in-app notification to all participants of a communication session to inquire if they want to share the replay of the shared content.

In some embodiments, distribution module 314 may allow the highly-interactive content to be powered into a third party application. For example, in a dating match show, audiences may jump into the show and interact in the show. When distributing the content including this participatory content through the creator's network to a third party (e.g., Netflix©), distribution module 314 may allow this participatory interaction to be included in the version provided by the Netflix® application (e.g., based on a purchase or license agreement).

To share/distribute the content with a user, distribution module 314 may embed a link to the shared content in the notification. Upon the selection of the link, the user may be directed to his/her profile, where the user may replay the shared content, share the replay, and/or view speaker insights and replay insights (e.g., depending on the user's role), etc. In some embodiments, a registered user (e.g., members and subscribers) may have an in-app profile and a public profile, while a non-registered user may have a public profile. The profile(s) includes every activity (e.g., participation, replay, share) of the user related to a communication session. The non-registered may be allowed to search and discover a communication session, request access to view the communication session, and view the communication session through the tools provided in his/her public user profile. In some embodiments, the activities related to communication sessions from the registered and non-registered users are captured and fed into at least analytics module 308 to generate analytics and insights for improving content generation.

Assessing Content

The present system not only allows creators to have far greater audience reach than existing content-generation networks, but also allows the creators and audience to grow values from the widely-distributed innovative content. On one hand, assessment module 316 may enable creators to get the most values from monetizing their content and enable audiences to get rewards from participating in and co-creating the content. On the other hand, assessment module 316 may also generate recommendations and suggestions to increase the values creators and/or audiences may get from their work.

Advantageously, assessment module 316 may leverage gamification to reward positive engagement and penalize negative engagement. This drives increased engagement and retention with an incentive system, which benefits the present platform in a long term. Also, assessment module 316 is able to tie user engagement into monetization, which advances the incentive system and ultimately leads to more revenue over time. Assessment module 316 further categorizes users into tiers to facilitate a creator's ability to understand the value of users participating in a communication session. Moreover, assessment module 316 may improve the system performance by simplifying the measurement of user contribution, facilitating monetization, introducing optional user subscriptions, etc. Assessment module 316 also benefits individual users, for example, avoiding excessively penalizing creators to incentivize them to be engaged for a long period of time and create quality content.

The Web3 content studio described herein, in some embodiments, may be considered as a credits platform. A credit reflects a user's reputation and engagement in communication sessions. For example, assessment module 316 may reward a user for meaningful engagement and positive behavior such as audience engagement, speaking with positive audience sentiment consistently, etc. A member may get credits from community discussion, transacts NFTs, etc. A creator may get credits, e.g., based on consistent and quality content generation.

In some embodiments, assessment module 316 may allow the reputation tier to be displayed in the user profile, such that creators know about who their followers are, to which audience the creators may pay close attention, etc. Assessment module 316 may also introduce other features such as credit decays, notification, etc., to credit management.

The other function that assessment module 316 achieves is to generate recommendations and suggestions to improve content quality and thus improve the values creators and/or audiences may get from their work. For example, assessment module 316 may suggest which creators should work together in a communication session, which audience should be invited or promoted to a virtual stage, which topics should be discussed, etc. Even in a live show, assessment module 316 may recommend who can be on stage at a given point of time based on real-time analysis of the show. Moreover, assessment module 316 may cause a hit prediction to be generated to show the likelihood that the content may become a hit.

Additionally, assessment module 316 may be used to enhance the collaboration between content creators and brands. In some embodiments, assessment module 316 may recommend sponsorships to creators and content to brands. Assessment module 316 may intelligently recommend brands to sponsor creators and logistically handle the execution of enhancing content and communication session creation experience. For example, assessment module 316 may allow a user to throw a Dominos® Pizza emoji on stage during a communication session sponsored by Dominos®, and, as a result, a pizza is delivered to the speaker's house. In some embodiments, assessment module 316 may allow sponsors to choose specific creators they want to sponsor. The sponsor can then create custom wallpapers, emojis, virtual goods, and/or gaming mechanics. If an audience member uses the sponsored emoji as a reaction, assessment module 316 may instruct a sponsorship module (not shown) to provide a unique content experience for participants of the show. For example, if Dominos© pizza sponsors Mark Cuban's show and a custom Dominos® pizza emoji is created, an audience in his show can throw this emoji on stage. As a result, every participant gets a Dominos© pizza gift certificate and a pizza is delivered to Mark Cuban's home.

Interactive Streaming

Figure 12A:
FIGS. 12A-12G illustrate example user interfaces associated with interactive streaming, according to some embodiments.

FIGS. 12A-12G illustrate user interfaces associated with interactive live streaming. Through interactive live streaming, audience can interact or influence the streaming experience in some way, for example, chatting, contributing, voting, asking, or even participating in the content. As discussed above, CMA 122 (e.g., distribution module 314) may distribute content of online communications from various networks and brands to millions of households on linear TV (e.g., using AVOD technique). When the content reaches a household, as depicted in FIG. 12A, a TV application 1202 managing the content can be preloaded to the household TV like Netflix®, AppleTV®, or other streaming applications. TV application 1202 may then communicate with a software application 1204 installed on a user's mobile phone such that the user may interact and play a role in the content present to the user.

Figure 12B:
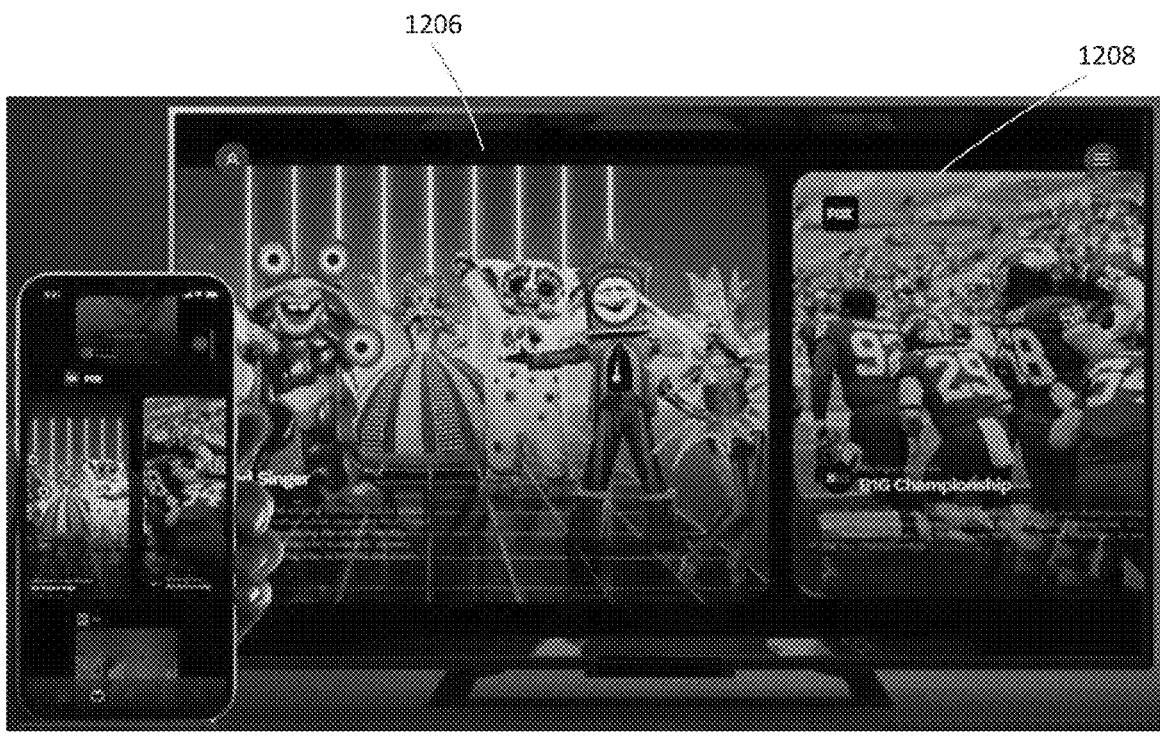

In FIG. 12B, a mobile application of a first user detects that the first user is using TV application 1202. As a result, the first user's TV will be operated as a second screen and his mobile application will be used as a remote control to control the second screen. The first user, using the mobile application as a remote control, can browse the content, discover different networks, glance preprograms, select and switch between contents, etc. Since the mobile phone (e.g., smart phone) is used to browse, discover, or make selections, these operations become easy and efficient due to the friendly user interfaces of the smart phone, bringing better experiences to users. For example, a simple left-right sweep on the mobile phone screen may allow the first user to switch and view 1206, 1208, and other content back and forth.

Figure 12C:
Figure 12D:

The first user may choose to view and interact with the cooking show of "Gordon Ramsay" in FIG. 12C. Since this show is labeled as "locked" 1210, only members or subscribers may access it. Upon the selection of this cooking show, the first user is prepared to "join live show" in 1212 when the membership verification process 1214 is running, as shown in FIG. 12D.

Figure 12E:
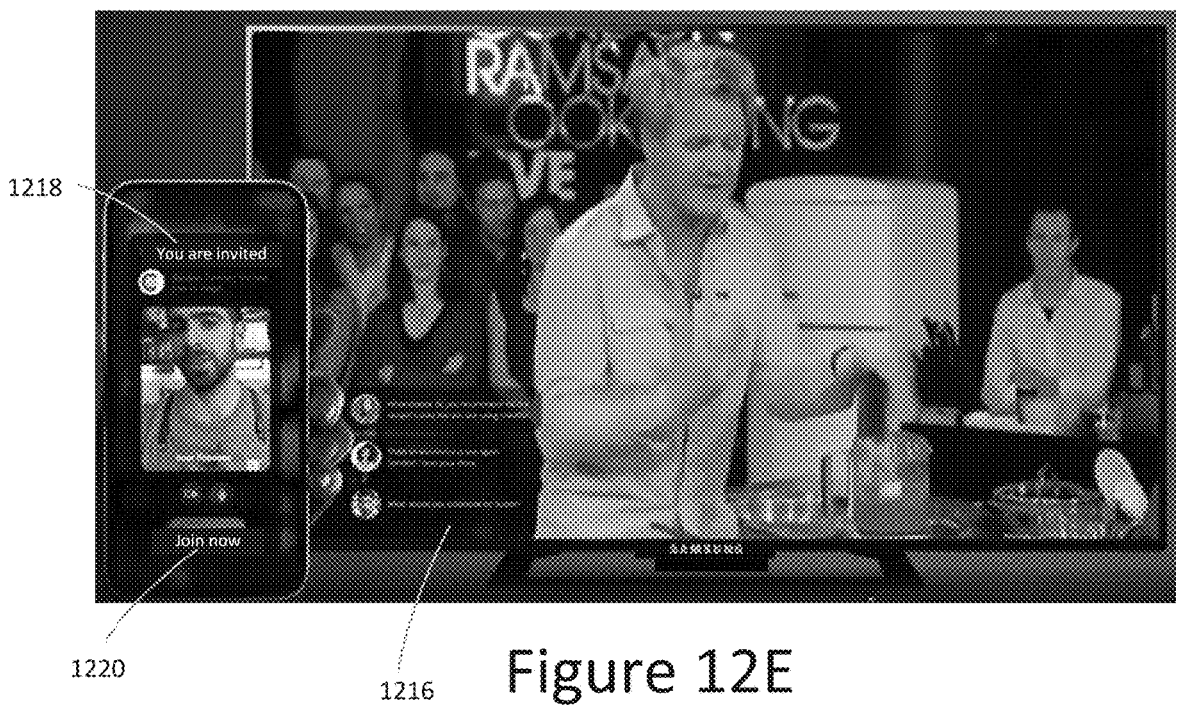
Figure 12F:
Figure 12G:
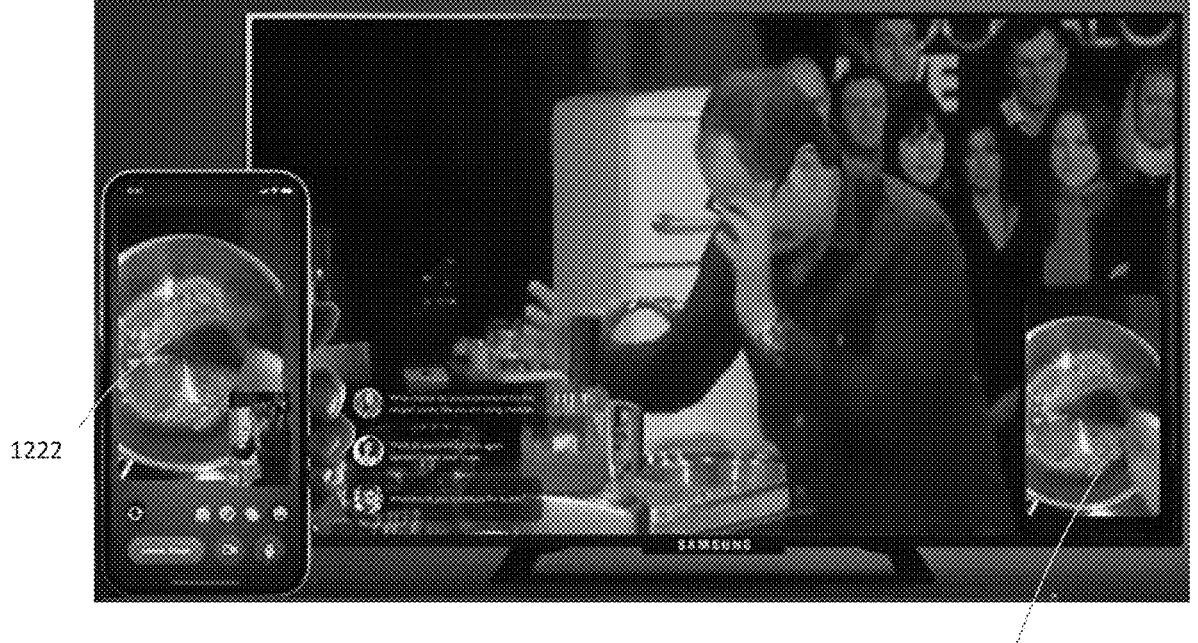

Once the membership of the first user is verified, the first user may interact with others and participate in the show using his mobile phone. FIG. 12E illustrates that the first user and other audiences in the show may laugh, clap, comment, ask chief Gordon Ramsay questions, e.g., as in 1216. The first user may also be invited 1218 to turned on his camera to join the virtual stage of the show in 1220. The first user then becomes part of the "Gordon Ramsay" cooking show as in FIG. 12F. That is, other audiences are now watching both Gordon Ramsay and the first user. The first user may cook as he is co-authoring the show with Gordon Ramsay and show his cooking product in 1222 of FIG. 12G.

Watchalong Feature

When watching content of an online communication on a user device (e.g., desktop, mobile device, TV, etc.) using a software application, a user may watch along with another user(s) who is watching it separately using his/her own device from a different location at the same time. The watchalong feature allows two or more remote users to watch a live or recorded show together and interact with each other about the show.

Users may participate in a communication to generate and present a watchalong content. In some embodiments, a user with subscription (e.g., subscriber, member) may access the content presented to the user (e.g., the original content). When the user participated in the original content (e.g., edit, comment, joined in the virtual stage, etc.), the original content will be modified to add annotations, expressions, or other content based on the user participation. As a result, the original content is converted into a watchalong content. For example, a user may purchase products or bid on membership when participating in a network communication session, and this purchase and/or bid will be used to generate the watchalong content, e.g., as shown in FIG. 2D.

In some embodiments, participation is only limited to users who have subscription. Once the watchalong content is generated, other users who have subscription may watch the watchalong content as a replay. In other embodiments, the watchalong feature also adds subscription access to the content of a communication session such that non-subscribers are able to react to the content. For example, if a communication session content is subscription only, the creator can publish this content with watchalong feature to include the participation content from non-subscribers.

Flowcharts

FIG. 13 illustrates a flowchart 1300 of generating and distributing collaborative content of communication sessions, according to some embodiments. In some embodiments, CMA 122 of data server 120 as depicted in FIG. 1 in communication with other components of platform 100 to implement process 1300. At step 1305, CMA 122 initiates a communication session in response to a request from a first user, the communication session associated with a set of audience including a second user. The first user is the host of the communication session (e.g., a comedy show) who sent a request to the CMA 122 (e.g., session unit 302) to start the communication session.

At step 1310, CMA 122 positions the second user on a virtual stage of the communication session. In some embodiments, CMA 122 may analyze user interactions in one or more communication sessions. The communication sessions may include the current communication session hosted by the first user. Based on the analysis, CMA 122 may prioritize the set of audience. For example, the audience may be categorized as superfans, fans, followers, etc., and provided different levels of priorities. CMA 122 may allow the first user to invite the second user (e.g., superfan) to join the virtual stage of the communication session based on the priorities of the audience. When the second user accepts the invite, CMA 122 may place the second user in the virtual stage.

At step 1315, CMA 122 enables the first user and the second user to co-host the communication session based on detecting and recording both the first user's activities and the second user's activities while the communication session is progressing. At step 1320, CMA 122 receives user interactions between the first user, the second user, and the other users in the set. For example, in the cooking show of FIGS. 4A and 4B, the viewer on the virtual stage is able to cook along with the chef, ask him questions about ingredients, cooking time, cooking tips, etc., and also present her cooked food to every attendee of the show. The chef can answer the viewer's question and instruct her when she is cooking. The other audience can comment, clap, express other feelings, etc. In this show, it appears that the chef, the viewer, and the other audience are in the same kitchen cooking together.

At step 1325, CMA 122 generates the content of the communication session to include the recorded activities and received user interactions. The resulting communication session is different from traditional sessions because it is a collaborative work from all attendees with highly interactive content.

FIG. 14 illustrates a flowchart 1400 of a process for a user to join a membership, according to some embodiments. In some embodiments, CMA 122 of data server 120 as depicted in FIG. 1 in communication with other components of platform 100 to implement process 1400. At step 1405, CMA 122 receives, from a user, a request to join a membership of network including one or more communication sessions. A communication session may be a live show, a webinar, an industry forum, an online chat through social networking service, a training session, or any other type of virtual meeting. At step 1410, CMA 122 displays, the user, membership information including a list of membership images. The user may select a membership image from the list. At step 1415, CMA 122 determines whether a selection of membership image from the list is received from the user. If no image selection is received from the user, method 1400 ends.

At step 1420, in response to receiving the selected membership image from the user, CMA 122 creates a digital wallet for the user to store virtual assets of the user. In some embodiments, the digital wallet may be a blockchain wallet. At step 1425, CMA 122 confirms the membership of the user based on storing the selected membership image and the digital wallet in a user profile associated with the user. In some embodiments, the membership is NFT-powered membership. Once the user joins the membership, CMA 122 may grant the user access to the creation of one or more communication sessions, providing the user exclusive access to new communication sessions, and/or allowing the user to transact the virtual assets with community members. In some embodiments, CMA 122 may also generate and provide a shared 3D metaverse for the first user and the second user to interactively and collaboratively create and consuming one or more communication sessions.

Additional Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component.

Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated and described in the figures above. Modules may constitute either software modules (e.g., code embodied on a machine-readable medium) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may include dedicated circuitry or logic that is permanently configured (e.g., as a special-purpose processor, such as a field programmable gate array (FPGA) or an application-specific integrated circuit (ASIC)) to perform certain operations. A hardware module may also include programmable logic or circuitry (e.g., as encompassed within a general-purpose processor or other programmable processors) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, include processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that includes a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" is employed to describe elements and components of the embodiments herein. This is done merely for convenience and to give a general sense of the claimed invention. This description should be read to include one or at least one and the singular also includes the plural unless it is obvious that it is meant otherwise.

Upon reading this disclosure, those of skill in the art will appreciate still additional alternative structural and functional designs for the system described above. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for generating and distributing collaborative content of one or more communications sessions established via a software application platform implemented over one or more communications networks, including for example the internet, the method comprising:

initiating the one or more communications sessions, each communication session associated with a set of one or more users including a first user and an audience comprising one or more second users;

positioning one or more of the first user and one or more of the second users on a virtual stage of one or more of the communications sessions;

detecting and recording activities of one or more of the first user, the one or more second users, and the audience while each communication session is in progress;

receiving user interactions between one or more of the first user, the one or more second users, and the audience, wherein the recorded activities may be used to represent user interactions; and generating content of each communication session to include one or more of the recorded activities and received interactions.

2. The method of claim 1, further comprising:

analyzing one or more of the user activities and user interactions in one or more of the communications sessions;

prioritizing a set of one or more second users from the audience based on the analysis of one or more of the user activities and user interactions; and inviting one or more of the second users to join the virtual stage based on the prioritized set of one or more second users from the audience, wherein positioning the one or more second users on the virtual stage is responsive to inviting the one or more second users to join the virtual stage.

3. The method of claim 1, wherein the user interactions include one or more of emojis, anemojis, gifs, video, and audio interactions, and wherein the platform may generate realistic volume and sound effects and visual effects to represent the user interactions, including the type or intensity of the user interactions.

4. The method of claim 1, wherein:

the one or more communications sessions include one or more video or image data streams;

the activities of the first user are shown in a first region of a frame of the one or more video or image data streams;

the activities of one or more of the second users are shown in a second region of the frame of the one or more video or image data streams; and the user interactions from one or more of the first user, the one or more second users, and the audience are shown in a third region of the frame of the one or more video or image data streams, wherein the first, second, and third regions comprise the same, separate, or overlapping regions in the frame.

5. The method of claim 1, further comprising providing a watch along feature enabling two or more existing users to view or watch content of at least one of the one or more communications sessions simultaneously with each other on different devices or from different locations.

6. The method of claim 1, further comprising providing a watch along feature enabling at least one existing user to provide access to one or more non-members to view or watch content of at least one of the one or more communications sessions simultaneously with the existing user on different devices or from different locations.

7. The method of claim 1, further comprising:

displaying available platform memberships information to one or more third users, wherein the one or more third users may further comprise one or more of the first user, the one or more second users, and audience users;

receiving from the one or more third users a request to join a specific membership of the platform;

in response to receiving the membership request, enabling information regarding one or more of a public profile and an in-application profile to respectively be input by the one or more third users, including via membership registration, or collected and recorded independently by the platform; and confirming the platform membership of the respective one or more third users and storing one or more of the public profile and the in-application profile associated with each of the corresponding one or more third users.

8. The method of claim 7, further comprising:

displaying available memberships information for one or more content creator networks, channels, or communities to the one or more third users;

receiving from one or more of the third users a request to join a specific membership of the one or more content creator networks, channels, or communities;

in response to receiving the one or more content creator network, channel, or community membership requests, enabling information regarding one or more of the public profile, the in-application profile, and an in-network, in-channel, or in-community profile, to respectively be input by the one or more third users, including via membership registration, or collected and recorded independently by one or more of the platform and the one or more content creator networks, channels, or communities; and confirming the one or more content creator network, channel, or community memberships of the respective one or more third users and storing one or more of the public profile, the in-application profile, and the in-network, in-channel, or in-community profile associated with each of the corresponding one or more third users.

9. The method of claim 7, further comprising:

providing one or more of the third users with exclusive access to one or more new communications sessions.

10. The method of claim 7, further comprising:

creating a digital wallet for one or more of the third users to store one or more virtual assets of the respective one or more third users; and enabling the one or more third users to transact the virtual assets via the digital wallet, including with the platform, content creator networks, channels, and communities, and other members and users, wherein such transactions include purchases of subscriptions or event tickets, brand sponsorships or branded content integrations, advertising or tips.

11. The method of claim 10, wherein the digital wallet comprises a blockchain wallet configured to store at least non-fungible tokens (NFTs) and one or more of the platform and content creator network, channel, or community memberships comprises an NFT-powered membership.

12. The method of claim 7, further comprising:

in response to confirming the membership of the respective one or more third users, granting one or more of the third users access to create a new content creator network, channel, or community and to initiate one or more of the communications sessions.

13. The method of claim 1, further comprising generating and providing a shared three-dimensional (3D) metaverse for the first user, the one or more second users, and the audience to interactively and collaboratively create and consume one or more of the communications sessions.

14. The method of claim 1, wherein the first user, one or more second users, and the audience directly communicate with each other via one or more of the platform and the one or more content creator networks, channels, or communities without using an external social platform as a middleman.

15. The method of claim 1, further comprising:

generating one or more insights related to at least one of content insights, speaker insights, replay insights, membership insights, profile insights, and revenue insights; and optionally suggesting or executing suggestions to improve one or more of content, editing, and monetization strategies.

16. The method of claim 1, further comprising distributing one or more of the communications sessions by at least one of:

broadcasting one or more of the communications sessions live on one or more of the platform and one or more content creator networks, channels, or communities; and recording one or more of the communications sessions and streaming the recorded communications sessions on demand or asynchronously.

17. A system for generating and distributing collaborative content of one or more communications sessions established via a software application platform implemented over one or more communications networks, including for example the internet, the system comprising:

a processor; and a memory in communication with the processor and comprising instructions which, when executed by the processor, program the processor to:

initiate the one or more communications sessions, each communication session associated with a set of one or more users including a first user and an audience including one or more second users;

position one or more of the first user and the one or more second users on a virtual stage of one or more of the communications sessions;

detect and record activities of one or more of the first user, the one or more second users, and the audience during the communications sessions;

receive user interactions between one or more of the first user, the one or more second users, and the audience; and generate content of the communication session to include the recorded activities and received user interactions.

18. The system of claim 17, wherein the instructions further program the processor to:

analyze one or more of the user activities and user interactions in one or more of the communications sessions;

prioritize a set of one or more second users in the audience based on the analysis of one or more of the user activities and user interactions; and invite one or more of the second users to join the virtual stage based on the prioritized set of one or more second users from the audience, wherein the positioning of the one or more second users on the virtual stage is responsive to the invitation of the one or more second users to join the virtual stage.

19. The system of claim 17, wherein the user interactions include one or more of emojis, anemojis, gifs, video, and audio interactions, and wherein the instructions further program the processor to generate realistic volume and sound effects and visual effects to represent the user interactions, including the type or intensity of the user interactions.

20. The system of claim 17, wherein the instructions further program the processor to:

display one or more of the communications sessions as one or more video or image data streams;

display the activities of the first user in a first region of a frame of the one or more video or image data streams;

display the activities of the one or more second users in a second region of the frame of the one or more video or image data streams; and display the user interactions from the audience in a third region of the frame of the one or more video or image data streams, wherein the first, second, and third regions comprise the same, separate or overlapping regions in the frame.

21. The system of claim 17, wherein the instructions further program the processor to enable two or more existing users to view or watch content of at least one of the communications sessions simultaneously with one another while using different devices or physically present at different locations.

22. The system of claim 17, wherein the instructions further program the processor to enable at least one existing user to provide access to one or more non-members to view or watch content of at least one of the communications sessions simultaneously with the existing user while the non-members and existing user are using different devices or are physically present at different locations.

23. The system of claim 17, wherein the instructions further program the processor to:

display available platform memberships information to one or more third users, wherein the one or more third users may further comprise one or more of the first user, the one or more second users, and the audience;

receive from the one or more third users a request to join a specific membership of the platform;

in response to receiving the membership request, enabling information regarding one or more of a public profile and an in-application profile to respectively be input by the one or more third users, including via membership registration, or collected and recorded independently by the platform; and confirm the membership of the respective one or more third users and storing one or more of the public profile and the in-application profile associated with each of the corresponding one or more third users.

24. The system of claim 23, wherein the instructions further program the processor to:

display available memberships information for one or more content creator networks, channels, or communities to one or more of the third users;

receive from one or more of the third users a request to join a specific membership of one or more of the content creator networks, channels or communities;

in response to receiving the one or more content creator network, channel or community membership requests, enabling information regarding the public profile, the in-application profile, and an in-network, in-channel, or in-community profile, to respectively be input by the one or more third users, including via membership registration, or collected and recorded independently by one or more of the platform and the one or more content creator networks, channels, or communities; and confirm the one or more content creator network, channel, or community memberships of the respective one or more third users and storing one or more of the public profile, the in-application profile, and the in-network, in-channel, or in-community profile associated with each of the corresponding one or more third users.

25. The system of claim 23, wherein the instructions further program the processor to:

provide the one or more third users with exclusive access to one or more new communications sessions.

26. The system of claim 23, wherein the instructions further program the processor to:

create a digital wallet for one or more of the third users to store one or more virtual assets of the respective one or more third users; and enable the one or more third users to transact the virtual assets via the digital wallet, including with the platform, content creator networks, channels, or communities, and other members and users, wherein such transactions include purchases of subscriptions or event tickets, brand sponsorships or branded content integrations, advertising or tips.

27. The system of claim 26, wherein the digital wallet comprises a blockchain wallet configured to store at least non-fungible tokens (NFTs) and one or more of the platform and content creator network, channel, and community memberships is an NFT-powered membership.

28. The system of claim 23, wherein the instructions further program the processor to:

in response to confirming the membership of the respective one or more third users, grant the one or more of the third users access to create a new content creator network, channel, or community and to initiate one or more of the communications sessions.

29. The system of claim 17, wherein the instructions further program the processor to generate and provide a shared three-dimensional (3D) metaverse for the first user, the one or more second users, and the audience to interactively and collaboratively create and consume one or more of the communications sessions.

30. The system of claim 17, wherein the instructions further program the processor to enable the first user, one or more second users, and the audience directly communicate with each other via one or more of the platform and the one or more content creator networks, channels, or communities without using an external social platform as a middleman.

31. The system of claim 17, wherein the instructions further program the processor to:

generate one or more insights related to at least one of content insights, speaker insights, replay insights, membership insights, profile insights, and revenue insights; and optionally suggest or execute suggestions to improve one or more of content, editing, and monetization strategies.

32. The system of claim 17, wherein the instructions further program the processor to distribute one or more of the communications sessions by performing at least one of:

broadcast one or more of the communications sessions live on one or more of the platform and one or more content creator networks, channels, or communities; and record one or more of the communications sessions and stream the recorded communications sessions on demand or asynchronously.

33. A computer program product for generating and distributing collaborative content of one or more communications sessions via a software application platform implemented over one or more communications networks, including for example the internet, the computer program product comprising a non-transitory computer-readable medium having computer readable program code stored thereon, the computer readable program code configured to:

initiate the one or more communications sessions, each communication session associated with a set of one or more users including a first user and an audience including one or more second users;

position one or more of the first user and one or more of the second users on a virtual stage of one or more of the communications sessions;

detect and record activities of one or more of the first user, the one or more second users, and the audience during the communications sessions;

receive user interactions between one or more of the first user, the one or more second users, and the audience; and generate content of the communication session to include the recorded activities and received user interactions.

34. The computer program product of claim 33, wherein the computer readable program code is further configured to:

analyze one or more of the user activities and user interactions in one or more of the communications sessions;

prioritize a set of one or more second users in the audience based on the analysis of one or more of the user activities and user interactions; and invite one or more of the second users to join the virtual stage based on the prioritized set of one or more second users from the audience, wherein the positioning of the one or more second users on the virtual stage is responsive to the invitation of the one or more second users to join the virtual stage.

35. The computer program product of claim 33, wherein the user interactions include one or more of emojis, anemojis, gifs, video, and audio interactions, and wherein the instructions further program the processor to generate realistic volume and sound effects and visual effects to represent the user interactions, including the type or intensity of the user interactions.

36. The computer program product of claim 33, wherein the computer readable program code is further configured to:

display one or more of the communications sessions as one or more video or image data streams;

display the activities of the first user in a first region of a frame of the one or more video or image data streams;

display the activities of the one or more second users in a second region of the frame of the one or more video or image data streams; and display the user interactions from the audience in a third region of the frame of the one or more video or image data streams, wherein the first, second, and third regions comprise the same, separate or overlapping regions in the frame.

37. The computer program product of claim 33, wherein the computer readable program code is configured to enable two or more existing users to view or watch content of at least one of the communications sessions simultaneously with one another while using different devices or physically present at different locations.

38. The computer program product of claim 33, wherein the computer readable program code is configured to enable at least one existing user to provide access to one or more non-members to view or watch content of at least one of the communications sessions simultaneously with the existing user while the non-members and existing user are using different devices or are physically present at different locations.

39. The computer program product of claim 33, wherein the computer readable program code is further configured to:

display available platform memberships information to one or more third users, wherein the one or more third users may further comprise one or more of the first user, the one or more second users, and the audience;

receive from the one or more third users a request to join a specific membership of the platform;

in response to receiving the membership request, enabling information regarding one or more of a public profile and an in-application profile to respectively be input by the one or more third users, including via membership registration, or collected and recorded independently by the platform; and confirm the membership of the respective one or more third users and storing one or more of the public profile and the in-application profile associated with each of the corresponding one or more third users.

40. The computer program product of claim 39, wherein the computer readable program code is configured to:

display available memberships information for one or more content creator networks, channels, or communities to one or more of the third users;

receive from one or more of the third users a request to join a specific membership of one or more of the content creator networks, channels or communities;

in response to receiving the one or more content creator network, channel or community membership requests, enabling information regarding the public profile, the in-application profile, and an in-network, in-channel, or in-community profile, to respectively be input by the one or more third users, including via membership registration, or collected and recorded independently by one or more of the platform and the one or more content creator networks, channels, or communities; and confirm the one or more content creator network, channel, or community memberships of the respective one or more third users and storing one or more of the public profile, the in-application profile, and the in-network, in-channel, or in-community profile associated with each of the corresponding one or more third users.

41. The computer program product of claim 39, wherein the computer readable program code is configured to:

provide the one or more third users with exclusive access to one or more new communications sessions.

42. The computer program product of claim 39, wherein the computer readable program code is configured to:

create a digital wallet for one or more of the third users to store one or more virtual assets of the respective one or more third users; and enable the one or more third users to transact the virtual assets via the digital wallet, including with the platform, content creator networks, channels, or communities, and other members and users, wherein such transactions include purchases of subscriptions or event tickets, brand sponsorships or branded content integrations, advertising or tips.

43. The computer program product of claim 42, wherein the digital wallet comprises a blockchain wallet configured to store at least non-fungible tokens (NFTs) and one or more of the platform and content creator network, channel, and community memberships is an NFT-powered membership.

44. The computer program product of claim 39, wherein the computer readable program code is configured to:

in response to confirming the membership of the respective one or more third users, grant the one or more of the third users access to create a new content creator network, channel, or community and to initiate one or more of the communications sessions.

45. The computer program product of claim 33, wherein the computer readable program code is configured to generate and provide a shared three-dimensional (3D) metaverse for the first user, the one or more second users, and the audience to interactively and collaboratively create and consume one or more of the communications sessions.

46. The computer program product of claim 33, wherein the computer readable program code is configured to enable the first user, one or more second users, and the audience directly communicate with each other via one or more of the platform and the one or more content creator networks, channels, or communities without using an external social platform as a middleman.

47. The computer program product of claim 33, wherein the computer readable program code is configured to:

generate one or more insights related to at least one of content insights, speaker insights, replay insights, membership insights, profile insights, and revenue insights; and optionally suggest or execute suggestions to improve one or more of content, editing, and monetization strategies.

48. The computer program product of claim 33, wherein the computer readable program code is configured to distribute one or more of the communications sessions by performing at least one of:

broadcast one or more of the communications sessions live on one or more of the platform and one or more content creator networks, channels, or communities; and record one or more of the communications sessions and stream the recorded communications sessions on demand or asynchronously.

\* \* \* \* \*